United States Patent
Khazanov et al.

(10) Patent No.: US 9,959,632 B2
(45) Date of Patent: *May 1, 2018

(54) OBJECT EXTRACTION FROM VIDEO IMAGES SYSTEM AND METHOD

(71) Applicant: PLAYSIGHT INTERACTIVE LTD., Kfar Saba (IL)

(72) Inventors: Evgeni Khazanov, Petah Tikva (IL); Chen Shachar, Kohav Yair (IL)

(73) Assignee: PLAYSIGHT INTERACTIVE LTD., Kfar Saba (IL)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/470,477

(22) Filed: Mar. 27, 2017

(65) Prior Publication Data
US 2017/0200281 A1  Jul. 13, 2017

Related U.S. Application Data

(63) Continuation of application No. 14/525,181, filed on Oct. 27, 2014, now Pat. No. 9,639,954.

(51) Int. Cl.
*G06K 9/46* (2006.01)
*G06T 7/254* (2017.01)
*G06K 9/00* (2006.01)
*G06T 7/194* (2017.01)
*G06T 7/215* (2017.01)

(52) U.S. Cl.
CPC .......... *G06T 7/254* (2017.01); *G06K 9/00751* (2013.01); *G06K 9/46* (2013.01); *G06T 7/194* (2017.01); *G06T 7/215* (2017.01); *G06T 2207/20224* (2013.01); *G06T 2207/30221* (2013.01)

(58) Field of Classification Search
None
See application file for complete search history.

(56) References Cited

U.S. PATENT DOCUMENTS

| | | | | |
|---|---|---|---|---|
| 5,748,775 A | * | 5/1998 | Tsuchikawa | G06K 9/00369 375/E7.083 |
| 5,757,287 A | * | 5/1998 | Kitamura | G08G 1/04 340/934 |
| 6,088,468 A | * | 7/2000 | Ito | G06T 7/254 342/454 |

(Continued)

FOREIGN PATENT DOCUMENTS

| | | | |
|---|---|---|---|
| JP | 10105689 A | * | 4/1998 |
| JP | 11242731 A | * | 9/1999 |
| JP | 2012014535 A | * | 1/2012 |

*Primary Examiner* — Iman K Kholdebarin
(74) *Attorney, Agent, or Firm* — Acuity Law Group, PC; Michael A. Whittaker

(57) ABSTRACT

A computer implemented method of object extraction from video images, the method comprising steps a computer is programmed to perform, the steps comprising: receiving a plurality of video images, deriving a plurality of background templates from at least one of the received video images, calculating a plurality of differences from an individual one of the received video images, each one of the differences being calculated between the individual video image and a respective and different one of the background templates, and extracting an object of interest from the individual video image, using a rule applied on the calculated differences.

19 Claims, 17 Drawing Sheets

(56) References Cited

U.S. PATENT DOCUMENTS

| | | | | | |
|---|---|---|---|---|---|
| 6,167,167 A | * | 12/2000 | Matsugu | .............. | H04N 19/503 358/538 |
| 6,546,115 B1 | * | 4/2003 | Ito | .................... | G08B 13/19602 348/169 |
| 6,650,779 B2 | * | 11/2003 | Vachtesvanos | ...... | G01N 21/956 348/88 |
| 6,956,573 B1 | * | 10/2005 | Bergen | .............. | G06F 17/30802 345/473 |
| 7,227,976 B1 | * | 6/2007 | Jung | ................. | G06K 9/00228 345/419 |
| 7,596,240 B2 | * | 9/2009 | Ito | ................... | G08B 13/19602 382/103 |
| 8,150,103 B2 | * | 4/2012 | Zhang | ............... | G06K 9/00711 382/103 |
| 8,340,368 B2 | * | 12/2012 | Lee | ........................ | C23C 8/80 280/730.1 |
| 2002/0025073 A1 | * | 2/2002 | Shibuya | .................. | G06K 9/48 382/199 |
| 2003/0035509 A1 | * | 2/2003 | Boehm | ................. | A61B 6/032 378/98.8 |
| 2003/0194131 A1 | * | 10/2003 | Zhao | ....................... | G06K 9/46 382/190 |
| 2006/0262188 A1 | * | 11/2006 | Elyada | ..................... | G06T 7/97 348/143 |
| 2008/0075372 A1 | * | 3/2008 | Stentiford | ............... | G06K 9/64 382/218 |
| 2008/0187219 A1 | * | 8/2008 | Chen | ................. | G06K 9/00711 382/173 |
| 2009/0074246 A1 | * | 3/2009 | Distante | ............ | A63B 71/0605 382/103 |
| 2009/0195372 A1 | * | 8/2009 | Aichi | .................... | G06F 3/0425 340/438 |
| 2010/0034423 A1 | * | 2/2010 | Zhao | ................. | G06K 9/00785 382/103 |
| 2010/0182433 A1 | * | 7/2010 | Shimbo | .............. | G06K 9/00771 348/153 |
| 2011/0221974 A1 | * | 9/2011 | Stern | ....................... | G06F 3/017 348/734 |
| 2012/0254369 A1 | * | 10/2012 | Gillard | ................ | H04N 13/004 709/219 |
| 2013/0129205 A1 | * | 5/2013 | Wang | .................. | G06K 9/6278 382/164 |
| 2014/0211988 A1 | * | 7/2014 | Fan | ...................... | G06K 9/3241 382/103 |
| 2015/0003743 A1 | * | 1/2015 | Nosaka | ............ | G08B 13/19604 382/203 |
| 2015/0154453 A1 | * | 6/2015 | Wilf | .................. | G06K 9/00711 382/103 |
| 2015/0310274 A1 | * | 10/2015 | Shreve | .............. | G06K 9/00624 382/103 |
| 2016/0005182 A1 | * | 1/2016 | Ashani | ..................... | G06K 9/46 382/173 |
| 2016/0012608 A1 | * | 1/2016 | Miyano | ................... | G06T 7/215 382/103 |

\* cited by examiner

OBJECT EXTRACTION FROM VIDEO IMAGES SYSTEM AND METHOD

CROSS-REFERENCE TO RELATED APPLICATIONS

This application is a continuation of U.S. patent application Ser. No. 14/525,181, filed Oct. 27, 2014, which is hereby incorporated in its entirety including all tables, figures, and claims.

FIELD AND BACKGROUND OF THE INVENTION

The present invention relates to image processing and, more particularly, but not exclusively to extracting objects of interest from video images captured during a sport event.

In recent years, the use of image processing and computer vision has been gaining more and more popularity in a variety of fields and industries. Some known industrial applications of image processing and computer vision include, for example, security surveillance systems, operational management systems (say in a retail industry environment), tactical battlefield systems, etc.

The extraction of objects of interest from video images is an aspect of video analysis.

One of the techniques widely used in the fields of image processing and computer vision is background subtraction.

Background subtraction is a technique in which an image's foreground is extracted for further processing, usually for recognition of objects of interest.

Generally, an image's foreground is made of regions of the image, which are occupied by objects of interest (humans, cars, text, etc.). After a stage of image preprocessing (which may include image noise removal, morphology based analysis, etc.), object localization may be required, which object localization may make use of background subtraction.

Background subtraction is widely used for detecting moving objects (say cars or pedestrians) in videos, from static cameras, the rationale being one of detecting the moving objects from the difference between the current frame and a reference background template, also referred to as "background image" or "background model", which is made of static objects such as a building or a traffic light positioned at a road intersection.

Objection extraction by background subtraction is often done if the image in question is a part of a video stream. Background subtraction provides important cues for numerous applications in computer vision, for example surveillance tracking or human poses estimation.

SUMMARY OF THE INVENTION

According to one aspect of the present invention there is provided a computer implemented method of object extraction from video images, the method comprising steps a computer is programmed to perform, the steps comprising: receiving a plurality of video images, deriving a plurality of background templates from at least one of the received video images, calculating a plurality of differences from an individual one of the received video images, each one of the differences being calculated between the individual video image and a respective and different one of the background templates, and extracting an object of interest from the individual video image, using a rule applied on the calculated differences.

According to a second aspect of the present invention there is provided an apparatus for object extraction from video images, the apparatus comprising: a computer, a video image receiver, implemented on the computer, configured to receive a plurality of video images, a background template deriver, in communication with the video image receiver, configured to derive a plurality of background templates from at least one of the received video images, a difference calculator, in communication with the background template deriver, configured to calculate a plurality of differences from an individual one of the received video images, each one of the differences being calculated between the individual video image and a respective and different one of the background templates, and an object extractor, in communication with the difference calculator, configured to extract an object of interest from the individual video image, using a rule applied on the calculated differences.

According to a third aspect of the present invention there is provided a non-transitory computer readable medium storing computer executable instructions for performing steps of object extraction from video images, the steps comprising: receiving a plurality of video image, deriving a plurality of background templates from at least one of the received video images, calculating a plurality of differences from an individual one of the received video images, each one of the differences being calculated between the individual video image and a respective and different one of the background templates, and extracting an object of interest from the individual video image, using a rule applied on the calculated differences.

Unless otherwise defined, all technical and scientific terms used herein have the same meaning as commonly understood by one of ordinary skill in the art to which this invention belongs.

The materials, methods, and examples provided herein are illustrative only and not intended to be limiting. Implementation of the method and system of the present invention involves performing or completing certain selected tasks or steps manually, automatically, or a combination thereof.

Moreover, according to actual instrumentation and equipment of preferred embodiments of the method and system of the present invention, several selected steps could be implemented by hardware or by software on any operating system of any firmware or a combination thereof.

For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. The description taken with the drawings making apparent to those skilled in the art how the several forms of the invention may be embodied in practice.

In the drawings:

FIG. 4A illustrates a player who stands in a left position next to one or more trees and a cloud.

FIG. 4B illustrates a player who stands in a right position next to one or more trees and a cloud.

FIG. 4C is a background template containing one or more trees and a cloud. It does not include the image of a player.

FIG. 4D is a background template containing one or more trees and a cloud. It also includes the image of a player in the left position.

FIG. 4E illustrates a player standing in a left position.

FIG. 4F illustrates a player who stands next to one or more trees and the sun coming out from behind a cloud.

FIG. 4G is a background template containing one or more trees and a cloud.

FIG. 4H illustrates a player who stands next to one or more trees, with the sun coming out from behind a cloud.

FIG. 6A illustrates a player who stands in a left position next to one or more trees and a cloud.

FIG. 6O shows a player standing in a right position.

DESCRIPTION OF THE PREFERRED EMBODIMENTS

Figure 1:
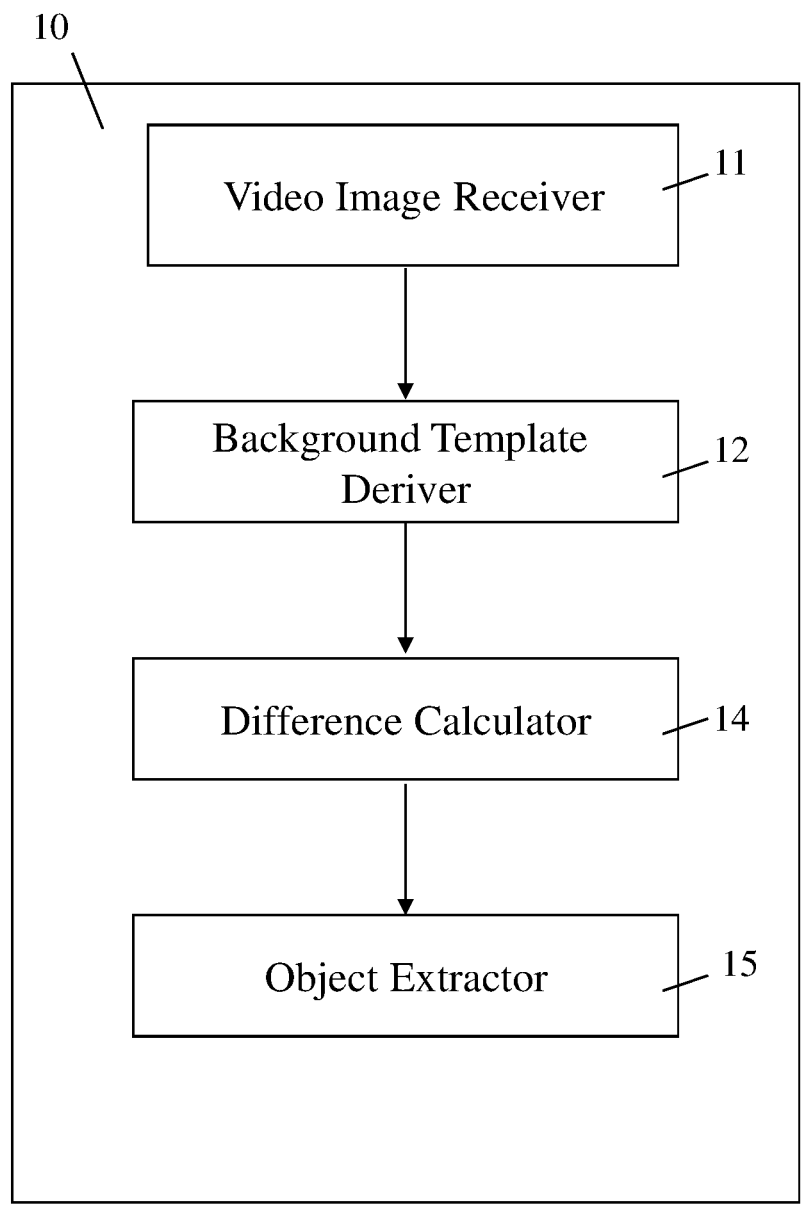
FIG. 1 is a block diagram schematically illustrating an exemplary apparatus for object extraction from video images, according to an exemplary embodiment of the present invention.

The present embodiments comprise an apparatus and a method for object extraction from video images, say from video images of a sport event, which are captured and streamed live during the sport event.

Indeed, the extraction of objects of interest from video images is a known aspect of image processing—in general, and of video analysis—in particular.

Specifically, an extraction of objects of interest (say a moving ball) may be used for real time analysis of sport events when being captured live by video cameras, say in order to localize the objects of interest and track their movements in a constrained environment (say a tennis court) in which the sport events takes place.

For example, an object of interest such as a moving ball, a running player, or an implement (say a tennis racket or a golf club), in use by a player during a sport event, may be extracted from the video images, in a process which involves a discarding of background from the video images.

The background is usually made of static objects (say a grass area of a court of tennis, lampposts, fences, walls, etc.), as captured in the image, but may additionally or alternatively include non-static objects (say an audience or moving tree leaves).

The discarding of background from an image may be carried out using one of several current background subtraction techniques.

An exemplary discarding of the background may be generally described as a method which includes a step of deriving a background template, usually from images acquired prior to acquiring an image of interest. The background template may be, for example, in a form of an image of a same size and dimensions as the acquired images. In the exemplary background template, pixels in areas of the images acquired prior to acquiring an image of interest, which appear to have minimal value (say intensity value) fluctuations and are within a predefined range of values, are marked as background pixels, as known in the art.

The derivation of the background template may be followed by a step of calculating a difference between the image of interest and the background template, say by calculating an intensity difference between each pixel of the image of interest and a pixel in the same position in the background template, as described in further detail hereinbelow.

The step of calculating the difference may be followed by a step of using a threshold, to extract an object of interest from the calculated difference, such that each pixel with an intensity difference greater than the threshold's value is deemed to belong to the object of interest.

The above described discarding of background may be carried out using one of several background subtraction techniques currently known in the art.

However, for any given set of video images, different background subtraction technique may potentially yield different results. Further, a variety of other parameters such as the number of images used for calculating the background template, or the threshold value in use, may also change the result.

Thus, the quality of the result depends on the background subtraction technique in use, as well as on parameters such as the number of images used for deriving the background template, or the threshold value in use, as described in further detail hereinbelow.

Further, the result's quality may depend on the nature of the background (say a changing audience vs. a rather static fence or wall), on the nature of the objects of interest (say on their speed of movement), etc. The result's quality may also depend on compatibility between the background subtraction technique and the parameters used when implementing the technique, as described in further detail hereinbelow.

Present embodiments are based on a discarding of background form an image, using two or more background templates. The background templates are derived from one or more video images, say from the image itself, from video images received earlier than the image, or from both the image itself and the images received earlier. The background templates may be derived using different background subtraction techniques, using partially different (say partially more recent) subsets of the images received earlier, etc., as described in further detail hereinbelow.

Thus, according to some embodiments of the present invention, there are received two or more video images, and two or more background templates are derived from the received video images.

Each one of the background templates may be derived using a method based on a different background subtraction technique, using a different subset of the received images (say an at least partially more recent subset of the received images, a subset consisting of a different number of video images), etc., as described in further detail hereinbelow.

Then, there are calculated a plurality of differences from an individual one of the video images, say from a most recently received one of the video images, which most recently received image is also referred to hereinbelow, as a current image.

Thus, for example, upon receipt of the current video image, from which an object of interest such as a ball in a soccer field, needs to be extracted, there are calculated a plurality of differences from that current video image. Each one of the differences is calculated between the current video image and a respective and different one of the calculated background templates, as described in further detail hereinbelow.

Each one of the differences may be calculated according to method based on a different background subtraction technique, using a different threshold used for binarizing the difference, etc., or using any combination thereof, as described in further detail hereinbelow.

Then, there is extracting an object of interest from the individual (say current) video image, using a rule which is applied on the calculated differences. The rule may be selected according to circumstances of capturing of the video images (say on weather conditions, time of day, or an indoor capturing vs. an outdoor capturing), according to the nature of the object of interest, etc., or any combination thereof.

Potentially, with the selected rule, different background subtraction techniques and/or parameter choices may be dynamically combined and balanced, so as to yield an optimized result, say using Boolean operators, preferences over different background templates, conditional uses of background templates, etc.

The principles and operation of an apparatus, a method, and a computer readable medium, according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings.

The invention is capable of other embodiments or of being practiced or carried out in various ways. Also, it is to be understood that the phraseology and terminology employed herein is for the purpose of description and should not be regarded as limiting.

Reference is now made to FIG. 1, which is a block diagram schematically illustrating an exemplary apparatus for object extraction from video images, according to an exemplary embodiment of the present invention.

An apparatus 10 for controlling cameras in a sport event, according to an exemplary embodiment of the present invention, includes a computer. The computer may include a single computer, a group of computers in communication over a network, one or more electric circuits, or any combination thereof.

The apparatus 10 further includes one or more additional parts, such as the parts denoted 11-15 in FIG. 1. The additional parts may be implemented as software, as hardware, or as a combination of hardware and software, on the computer, as described in further detail hereinbelow.

In one example, the apparatus 10 communicates with one or more cameras, for receiving images, say for receiving live video images of a sport event such as a tennis match or a soccer game, as described in further detail hereinbelow.

The apparatus 10 includes a video image receiver 11, implemented on the computer.

The video image receiver 11 receives one or more images (say a video stream) from the one or more cameras, as described in further detail hereinbelow.

For example, the video images may be images which the video image receiver 11 receives in one or more video streams of images captured live by one or more of the cameras during a tennis match, one or more stills images which capture the empty tennis court before the match begins and the court, ball and players during the match, etc.

The apparatus 10 further includes a background template deriver 12, in communication with the video image receiver 11.

The background template deriver 12 derives two or more background templates. Each one of the background templates is derived from one or more of the received video images, say from the stills image which captures the empty tennis court before the match begins, from a subset of the received live video stream's images, etc., as described in further detail hereinbelow.

Optionally, the background template deriver 12 derives the background templates, using one or more current background subtraction methods.

For example, with rather basic background subtraction methods, the background template may simply be the stills image captured before the match begins or rather an image in which each pixel's grey level intensity is a median or average of grey level intensities of pixels of a same position, in some or all of the video images received by the video image receiver 11.

The background template deriver 12 may additionally or alternatively derive the background templates, using other background subtraction methods, say using methods based on one or more running Gaussian averages, using Kernel Eigen-background methods, using methods based on movement detection, using methods based on shape filters, etc., as known in the art.

Optionally, the background template deriver 12 derives each one of at least two of the background templates, using a respective and different one of a plurality of background calculation methods.

Optionally, the background template deriver 12 derives each one of at least two of the background templates, using a respective and at least partially different subset of the video images received by the video image receiver 11.

Optionally, the background template deriver 12 derives each one of at least two of the background templates, using a respective and at least partially less recent subset of the video images received by the video image receiver 11.

Thus, in one example, a first one of the background templates is derived from recent twenty of the received video images, whereas a second one of the background templates is derived from recent thirty of the received video images. Consequently, the second background template's thirty images include ten images less recent than the first background template's twenty images. The second background template is thus at least partially less recent than the first background template.

Optionally, the background template deriver 12 derives each one of at least two of the background templates, using a respective and different frequency of sampling of the received video images, be the frequency based on time, on order of receipt by the video image receiver 11, etc.

Thus, in one example, the background template deriver 12 derives a first background template from ten of the received video images of a sequence of video images streamed to apparatus 10. Each one of the ten video images is an image received by the video image receiver 11 a couple of seconds before the next one of the ten images (say with a number of video images received in between the two images).

In the example, the background template deriver 12 further derives a second background template from ten of the video images received by the video image receiver 11.

However, each one of the ten video images which the second background template is derived 22 from, is an image received by the video image receiver 11 three seconds before the next one of the ten images (i.e. with a greater number of images received in between the two images).

Similarly, in another example, the background template deriver 12 derives a first background template from twenty of the video images of a sequence of video images streamed to apparatus 10 from one or more of the cameras, and received by the video image receiver 11. In the example, the twenty images include each tenth image streamed from the camera, thus each one of the twenty images is an image received tenth in the sequence, after an image added earlier to the twenty images.

In the example, the background template deriver 12 further derives a second background template from twenty of the received video images of the sequence of video images streamed to apparatus 10.

However, the twenty images include each fifth image, thus each one of the twenty images is an image received 21 fifth in the sequence streamed from the camera, after an image added earlier to the twenty images.

Optionally, the background template deriver 12 derives each one of at least two of the background templates using a respective and different in size subset of the video images received by the video image receiver 11.

Thus, in one example, the background template deriver 12 derives a first one of the background templates from twenty of the received video images, whereas the background template deriver 12 derives a second one of the background templates from ten of the received video images, as described in further detail hereinbelow.

Optionally, the background template deriver 12 further updates each one of at least two of the background templates, with a respective and different update rate.

Thus, in one example, the background template deriver 12 derives a first background template from a subset which consists of twenty of the received video images. Every ten seconds, the background template deriver 12 updates the first background template, by discarding one image of earliest receipt among the twenty images, from the subset, and adding an image received by the video image receiver 11 immediately before the updating, to the subset.

Then, the background template deriver 12 derives (i.e. re-calculates) the first background template again, according to the thus updated subset of twenty images. Thus, the background template deriver 12 derives the first background template dynamically, with an update rate of ten seconds.

In the example, the background template deriver 12 derives a second background template from a subset which also consists of twenty of the received video images. Every five seconds, the background template deriver 12 updates the second background template, by discarding one image of earliest receipt among the twenty images, from the subset, and adding an image received by the video image receiver 21 immediately before the updating, to the subset.

Then, the background template deriver 12 derives (i.e. re-calculates) the second background template again, according to the thus updated subset of twenty images. Thus, the second background template is also derived dynamically by the background template deriver 12. However, the second background template is rather derived by the background template deriver 12, with an update rate of five seconds.

In one example, the apparatus 10 is used for implementing a method for locating objects of interest, such as a ball or a player, during a sport event, and for tracking the movements of the objects of interest, in a three dimensional space. The three dimensional space represents a constrained environment, say of a tennis court's environment or a football field's environment.

In the example, the apparatus 10 communicates with one or more cameras during a live sport event. During the sport event each one of the cameras feeds a stream of live images to the video image receiver 11.

Optionally, the fed streams of video images are used to build a three dimensional (3D) model of a constrained environment of the sport event (say the tennis court) and the movement of the players and ball therein, say through stereoscopic analysis, as known in the art.

In the example, there is needed to extract an object of interest (say a tennis ball or a soccer player) from an individual one of the received video images, say from each fed stream of video images' most recent image. The object of interest is extracted from the individual image, using two or more background templates. Each one of the background templates is derived from one or more of the fed stream's video images, say from the fed stream's images received prior to that most recent image (i.e. some or all of the sequence's earlier images), as described in further detail hereinbelow.

The apparatus 10 further includes a difference calculator 14, in communication with the background template deriver 12.

The difference calculator 14 calculates a plurality of differences from the individual one of the received video images, say from the most recently received one of the video images, also referred to hereinbelow as the current image.

Each one of the differences is calculated between the individual video image and a respective and different one of the background templates derived by the background template deriver 12. Thus, for calculating each one of the differences, the difference calculator 14 uses a different one of the background templates derived by the background template deriver 12, as described in further detail hereinbelow.

The apparatus 10 further includes an object extractor 15, in communication with the difference calculator 14.

The object extractor 15 extracts one or more objects of interest from the individual (say current) video image, using a rule applied on the differences calculated by the difference calculator 14, as described in further detail hereinbelow.

The rule serves as a basis for comparison, weighting, or any other pattern of decision making, according to which decision making, the portion of the individual image in which the object of interest is captured, is identified by the object extractor 15, thus extracting the object of interest, as described in further detail hereinbelow.

Optionally, a user of apparatus 10 is allowed to select the rule applied on the calculated differences among two or more rules predefined by a user, administrator, or developer of apparatus 10, or rather to select a rule by inputting the rule himself.

In one example, the apparatus 10 further includes a graphical user interface which is operable by a user or an administrator of apparatus 10, for selecting the rule applied on the calculated differences or for defining the rule using natural language, as known in the art.

Additionally or alternatively, the object extractor 15 may select the rule applied on the calculated differences automatically, as described in further detail hereinbelow.

Optionally, the object extractor 15 automatically selects the rule applied on the calculated differences among two or more alternative rules predefined by a user, administrator, or developer of apparatus 10. For example, the rule may be selected according to user input or automatically set parameters, such as weather conditions (say cloudy vs. sunny), an average speed of the object of interest (say a ball), a time of day, etc.

Optionally, the object extractor 15 automatically selects the rule applied on the calculated differences, among the two or more predefined rules, according to circumstances of capturing of the video images. The circumstances may include, for example, a type of a sport event captured in the video images (say Tennis vs. Golf), weather conditions (say cloudy vs. sunny), time of day (say evening vs. morning), etc., or any combination thereof.

Thus, in one example, when an optical sensor, or a user input data, indicates a sunny weather, the applied rule may give less (or even zero) weight to calculated differences based on background templates derived from a small subset of the video images. For example, the rule may dictate relying only on the below example's difference based on the background template derived from the recent twenty video images while discarding the background templates derived from ten and five of the received video images.

In another example, when the optical sensor or user input data indicates a partially cloudy weather, the applied rule may give a same weight to differences based on background templates derived from subsets of the received video images, which subsets differ in their sizes, say by relying on a logical conjunction applied on the below example's three differences.

In yet another example, when the optical sensor indicates a cloudy weather, the applied rule may be based only on two of the below example's differences, say on a logical conjunction applied only on the below example's two differences which are based on the background templates derived from the ten and five video images.

Optionally, the object extractor 15 automatically selects the rule applied on the calculated differences among the two or more predefined rules, according to a characteristic which pertains to the object of interest. For example, the rule applied on the calculated differences may be automatically selected according to the object of interest's (say player's) size or average speed, as measured during the tennis match (or during previously played matches), or as input (say by a user or administrator of the apparatus 10).

Thus, in one example, with a different size or average speed of the object of interest, a different one or two of the below made example's three calculated differences, may be used, to extract the object of interest, say using a Boolean or other rule applied on the one or two differences, as described in further detail hereinbelow.

Optionally, the object extractor 15 automatically selects the rule applied on the calculated differences, among the two or more predefined rules, according to a characteristic which pertains to the background, say the background's being more static (say a fence or gate) as apposed to the background's being less static (say an audience of sport fans).

Optionally, the object extractor 15 determines the background's character, say if the background is more static or less static, say based on data input by a user of the apparatus 10, based on processing of audio input which originates from the audience areas, etc.

Thus, in one example, with a background which the object extractor 15 determines to be less static, the object extractor 15 uses one of the calculated differences, to extract the object of interest. However, with a background which the object extractor 15 determines to be more static, the object extractor 15 uses another one of the calculated differences, to extract the object of interest.

Optionally, the deriving of the background templates by the background template deriver 12, is also based on a rule which the background template deriver 12 selects automatically among two or more predefined rules, or rather on a rule which is selected by a user, say using a graphical user interface, a natural language, etc., as described in further detail, and illustrated using FIG. 2, hereinbelow Optionally, the apparatus 10 further includes a binarizer, in communication with said difference calculator 14.

The binarizer binarizes the differences calculated by the difference calculator 14, say using a threshold value, as described in further detail hereinbelow.

In one example, after the binarizer binarizes the calculated differences, using the threshold value, the object extractor 15 automatically selects a rule based on a logical conjunction, and applies the rule on the differences, by applying logical conjunction among the binarized differences. By applying the logical conjunction among the binarized differences, the object extractor 15 extracts the object of interest from the individual (say current) video image.

More specifically, in the example, the received images are grayscale digital images of a same video stream, and the individual video image is the video stream's most recent image, also referred to hereinbelow as the current image.

In the example, the background template deriver 12 derives each pixel in each one of the background templates, by averaging over grayscale intensity values of all pixels of a same position, in a different number of the received video images.

For example, a first background template is derived by averaging over the intensity values of pixels in a same position in recent twenty of the received video images. A second background template is derived by averaging over intensity values of pixels in a same position in recent ten of the received video images. Further, a third background template is derived by averaging over intensity values of pixels in a same position in recent five of the received video images.

In the example, the difference calculator 14 calculates a difference between the current image and each one of the three background templates, respectively, thus calculating a difference per each one of the three background templates. The resultant three differences are in the form of an image of a same size as of each one of the received video images.

In the difference, each pixel's grayscale intensity equals the difference between the current image's grayscale intensity in that pixel (i.e. in the same position) and the average intensity for that pixel's position, as indicated in the background template (say the grayscale intensity of the background template in that pixel position).

Optionally, for binarizing the difference, the binarizer compares each one of the difference's pixels to a threshold. The threshold's value may be set manually, say by a user of apparatus 10, using the graphical user interface.

Alternatively, the binarizer may determine the threshold automatically, say according to a rule based on user input or automatically set parameters, such as weather conditions (say cloudy vs. sunny), an average speed of the object of interest (say a ball), a time of day, etc.

In one example, if the grayscale intensity of the difference's pixel exceeds the threshold's value, the binarizer sets the pixel's grayscale intensity to a value representing a binary '1', say to maximum. Otherwise, the binarizer sets the pixel's grayscale intensity to a value representing a binary '0', say to minimum.

Then, in accordance with a rule used in the instant example, a logical conjunction is applied among the three binarized differences, for extracting the object of interest. Each pixel set to a binary '1' in all three differences, is deemed to mark a respective current image's pixel position occupied by the object of interest, and the remaining pixels are deemed to mark positions of the current image's background, as described in further detail hereinbelow.

That is to say that in the instant example, a logical conjunction of the binarized differences results in a binary (say black and white) image which maps the current image's area which is occupied by the object of interest.

Figure 2:
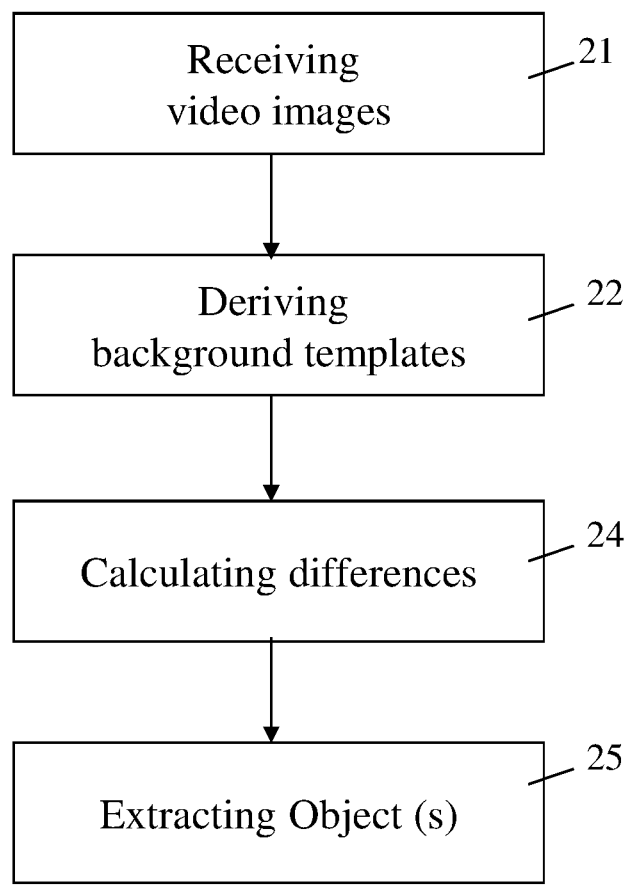
FIG. 2 is a simplified flowchart schematically illustrating a first exemplary method for object extraction from video images, according to an exemplary embodiment of the present invention.

Reference is now made to FIG. 2, which is a simplified flowchart schematically illustrating a first exemplary method for object extraction from video images, according to an exemplary embodiment of the present invention.

A first exemplary method for object extraction from video images, according to an exemplary embodiment of the present invention, may be executed by a computer. The computer may include a single computer, a group of computers in communication over a network, one or more electric circuits, or any combination thereof.

In one example, for carrying out the first exemplary method, the computer communicates with one or more cameras, through the internet, an intranet network, a local area network, another network, or any combination thereof, for receiving video images captured live during a sport event, as described in further detail hereinbelow.

In the method, there are received 21 one or more video images, say by the video image receiver 11 of apparatus 10, as described in further detail hereinabove.

In one example, there is received 21 a live video stream of images captured live by one or more cameras during a tennis match, one or more stills images which capture the empty tennis court before the match begins, and the court, ball and players during the match, etc.

Next, there are derived 22 two or more background templates from the received 21 video images, say by the background template deriver 12 of apparatus 10, as described in further detail hereinabove.

Optionally, the background templates are derived 22 using one or more current background subtraction methods, as described in further detail hereinabove.

For example, with rather basic background subtraction methods, the background template may simply be the stills image captured before the match begins or rather an image in which each pixel's grey level intensity is a median or average of grey level intensities of pixels of a same position, in some or all of the received 21 video images, as described in further detail hereinabove.

The background templates may also be derived 22 with other background subtraction methods, say with methods based on one or more running Gaussian averages, with Kernel Eigen-background methods, with methods based on movement detection, with methods based on shape filters, etc., as known in the art.

Optionally, each one of at least two of the background templates is derived, using a respective and different one of a plurality of background calculation methods.

Optionally, each one of at least two of the background templates is derived 22 using a respective and at least partially different subset of the received 21 video images.

Optionally, each one of at least two of the background templates is derived 22 using a respective and at least partially less recent subset of the received 21 video images.

Thus, in one example, a first one of the background templates is derived 22 from recent twenty of the received 21 images, whereas a second one of the background templates is derived 22 from recent thirty of the received 21 images. Consequently, the second background template's thirty images include ten images which are less recent than the first background template's twenty images. The second background template is thus at least partially less recent than the first background template.

Optionally, each one of at least two of the background templates is derived 22 using a respective and different frequency of sampling of the received 21 video images, be the frequency based on time, on order of receipt 21, etc., as described in further detail hereinabove.

Thus, in one example, a first background template is derived 22 from ten of the received 21 images of a sequence of video images streamed to apparatus 10, say from one of the cameras. Each one of the ten video images is an image received 21 a couple of seconds before the next one of the ten video images (say with a number of video images in between the two video images).

In the example, a second background template is also derived 22 from ten of the received 21 video images. However, each of the ten video images which the second background template is derived 22 from, is an image received 21 three seconds before the next one of the ten video images (i.e. with a greater number of video images in between the two video images).

Similarly, in another example, a first background template is derived 22 from twenty of the received 21 video images of a sequence of video images streamed to apparatus 10, say from one of the cameras. In the example, the twenty video images include each tenth video image streamed from the camera, thus each one of the twenty video images is an image received 21 tenth in the sequence, after an image added earlier to the twenty video images.

In the example, a second background template is also derived 22 from twenty of the received 21 video images of the sequence of video images streamed to apparatus 10. However, the twenty video images include each fifth video image, thus each one of the twenty video images is an image received 21 fifth in the sequence streamed from the camera, after an image added earlier to the twenty video images.

Optionally, each one of at least two of the background templates is derived 22 using a respective and different in size subset of the received 21 video images. Thus, in one example, a first one of the background templates is derived 22 from twenty of the received 21 video images, whereas a second one of the background templates is derived 22 from ten of the received 21 video images, as described in further detail hereinabove.

Optionally, the method further includes updating each one of at least two of the background templates, with a respective and different update rate, say by the background template deriver 12, as described in further detail hereinabove.

Thus, in one example, a first background template is derived 22 from a subset which consists of twenty of the received 21 video images. Every ten seconds, the first background template is updated by discarding one image of earliest receipt 21 among the twenty video images, and adding an image received 21 immediately before the updating, to the subset.

Then, the first background template is derived 22 again (i.e. re-calculated), according to the thus updated subset of twenty video images. Thus, the first background template is derived 22 dynamically, with an update rate of ten seconds.

In the example, a second background template is derived 22 from a subset which also consists of twenty of the received 21 video images. Every five seconds, the second background template is updated by discarding one image of earliest receipt 21 among the twenty video images, and adding an image received 21 immediately before the updating, to the subset.

Then, the second background template is derived 22 again (i.e. re-calculated), according to the thus updated subset of twenty video images. Thus, the second background template is also derived 22 dynamically. However, the second background template is rather derived 22 with an update rate of five seconds.

In one example, the first exemplary method is used as a part of a method for locating objects of interest, such as a ball or a player, during a sport event, and for tracking the movements of the objects of interest, in a three dimensional space. The three dimensional space represents a constrained environment, say of a tennis court's environment or a football field's environment, and movement of the object therein, as described in further detail hereinabove.

In the example, the apparatus 10 communicates with one or more cameras during a live sport event. During the sport event each one of the cameras feeds a stream of live images to the video image receiver 11.

Optionally, the fed streams of video images are used to build a three dimensional (3D) model of a constrained environment of the sport event (say the tennis court) and the movement of the players and ball therein, say through stereoscopic analysis, as known in the art.

In the example, there is needed to extract an object of interest (say a tennis ball or a soccer player) from an individual one of the received 21 video images, say from each fed stream of video images' most recent image.

The object of interest is extracted 25 from the individual image, using two or more background templates. Each one of the background templates is derived 22 from one or more of the fed stream's video images, say from the fed stream's images received 21 prior to that most recent image (i.e. some or all of the sequence's earlier images), as described in further detail hereinbelow.

Then, there are calculated 24 a plurality of differences, say by the difference calculator 14 of apparatus 10, as described in further detail hereinabove. Each one of the differences is calculated 24 between the individual (say current) video image and a respective and different one of the derived 22 background templates. Thus, the derived 22 background template used for calculating 24 each difference, is a different one.

Subsequently, one or more objects of interest is extracted 25 from the individual video image, using a rule applied on the calculated 24 differences, say by the object extractor 15 of apparatus 10, as described in further detail hereinabove.

The rule serves as a basis for comparison, weighting, or any other pattern of decision making, according to which decision making, the portion of the individual video image in which the object of interest is captured, is identified, thus extracting 25 the object of interest from the individual video image.

The rule applied on the calculated 24 differences may be selected by a user, or rather be selected automatically, say by apparatus 10, as described in further detail hereinabove.

In one example, the method further comprises binarizing the calculated 24 differences, using a threshold value, and the rule applied on the differences dictates applying logical conjunction among the binarized differences, for extracting 25 the object of interest.

More specifically, in the example, the received 21 video images are grayscale digital images which belong to a same video stream. The individual image is the video stream's most recent image (also referred to hereinbelow as the current image), and two or more background templates are derived 22 from the received 21 video images. Each one of the background templates is derived 22 from one or more of the received 21 images, say from a different number of the received 21 video stream's earlier images, as described in further detail hereinabove.

In the example, each pixel in each one of the background templates is derived 22 by averaging over grayscale intensity values of all pixels of a same position, in a different number of the video images used for deriving 22 the background template.

For example, a first background template is derived 22 by averaging over the intensity values of pixels in a same position in recent twenty of the received 21 video images. A second background template is derived 22 by averaging over intensity values of pixels in a same position in recent ten of the received 21 video images. Further, a third background template is derived 22 by averaging over intensity values of pixels in a same position in recent five of the received 21 video images.

In the example, a difference is calculated 24 between the individual, say current (i.e. the most recent) image and each one of the three background templates, respectively, thus calculating 24 a difference per each one of the three background templates. The resultant difference is in the form of an image of a same size as of each one of the received 21 video images.

In the difference, each pixel's grayscale intensity value equals the difference between the individual (say current) image's grayscale intensity in that pixel (i.e. in the same position) and the average intensity for that pixel's position, as indicated in the background template (say the grayscale intensity of the background template in that pixel position).

Optionally, for binarizing the difference, each one of the difference's pixels is compared to a threshold. The threshold's value may be set manually—say by a user of apparatus 10, or rather be determined automatically—say according to a rule based on user input or automatically set parameters, such as weather conditions (say cloudy vs. sunny), an average speed of the object of interest (say a ball), a time of day, etc.

In one example, if the grayscale intensity value of the difference's pixel exceeds the threshold value, the pixel's grayscale intensity is set to a value representing a binary '1', say to maximum. Otherwise, the pixel's grayscale intensity is set to a value representing a binary '0', say to minimum.

Then, in accordance with a rule used in the instant example, a logical conjunction is applied among the three binarized differences, for extracting 25 the object of interest. Each pixel set to a binary '1' in all three differences, is deemed to mark a respective individual (say current) image's pixel position occupied by the object of interest. The remaining pixels are deemed to mark positions of the individual image's background, as described in further detail hereinbelow.

That is to say that in the instant example, a logical conjunction of the binarized differences results in a binary (say black and white) image which maps the individual image's area which is occupied by the object of interest.

Optionally, a user of apparatus 10 is allowed to select the rule applied on the calculated 24 differences among two or more rules predefined by a user, administrator, or developer of apparatus 10, or rather to select the rule by inputting the rule himself (say using natural language, a GUI, etc., as known in the art).

Optionally, the rule applied on the calculated 24 differences is automatically selected among two or more alternative rules predefined by a user, administrator, or developer of apparatus 10, say by the object extractor 15. For example, the rule may be selected according to a user input or according to automatically set parameters, such as weather conditions (say cloudy vs. sunny), an average speed of the object of interest (say a ball), a time of day, etc.

Optionally, the rule applied on the calculated 24 differences is automatically selected among the two or more predefined rules, according to circumstances of capturing of the video images. The circumstances may include, for example, a type of a sport event captured in the images (say Tennis vs. Golf), weather conditions (say cloudy vs. sunny), time of day (say evening vs. morning), etc., or any combination thereof.

Thus, in one example, when an optical sensor, or a user input data, indicates a sunny weather, the applied rule may give less (or even zero) weight to calculated 24 differences based on background templates derived 22 from a small subset of the received 21 video images. For example, the rule may dictate relying only on the above example's difference based on the background template derived from the recent twenty of the received 21 video images while discarding the background templates derived 22 from ten and five of the received 21 video images.

In another example, when the optical sensor or user input data indicates a partially cloudy weather, the applied rule may give a same weight to differences based on background templates derived 22 from subsets of different sizes, say by relying on a logical conjunction applied on the above example's three differences.

***In yet another example, when the optical sensor indicates a cloudy weather, the applied rule may be based on only two of the above example's differences, say on a logical conjunction applied only on the above example's two differences which are based on the background templates derived from the ten and five video images.

Optionally, the rule applied on the calculated 24 differences is automatically selected among the two or more predefined rules, according to a characteristic which pertains to the object of interest. For example, the rule applied on the calculated 24 differences may be automatically selected according to a size or an average speed of the object (say a ball or player), as measured during the match (or during previously played matches), or as input by a user, as described in further detail hereinabove.

Thus, in one example, with a different size or average speed of the object of interest, a different one or two of the above made example's three calculated 24 differences, may be used, to extract 25 the object of interest, say using a Boolean or other rule applied on the one or two differences, as described in further detail hereinabove.

Optionally, the rule applied on the calculated 24 differences is automatically selected among the two or more predefined rules, according to a characteristic which pertains to the background, say the background's being more static (say a fence or gate) as apposed to the background's being less static (say an audience of sport fans).

Optionally, the background's being more static or less static is determined by the object extractor 15 of apparatus 10, say based on data input by a user of the apparatus 10, based on processing of audio input which originates from the audience areas, etc.

Thus, in one example, with a background which is less static, one of the calculated 24 differences may be used, to extract 25 the object of interest, whereas with a background which is more static, another one of the calculated 24 differences may be used, to extract 25 the object of interest.

Optionally, the deriving 22 of the background templates is based a rule selected among two or more of predefined rules.

Optionally, a user of apparatus 10 is allowed to select the rule used for the deriving 22 the background templates among two or more rules predefined by a user, administrator, or developer of apparatus 10, or rather to select the rule by inputting the rule himself (say using natural language, and a graphical user interface, as known in the art), as described in further detail hereinabove.

Optionally, the rule used for deriving 22 the background templates, is automatically selected among two or more rules predefined by a user, administrator, or developer of apparatus 10.

For example, the rule may be selected according to a user input or according to automatically set parameters, such as weather conditions (say cloudy vs. sunny), an average speed of the object of interest (say a ball), a time of day, etc.

Optionally, the rule used for the deriving 22 the background templates, is automatically selected among the two or more predefined rules, according to circumstances of capturing of the received 21 video images. The circumstances may include, for example, a type of a sport event captured in the video images (say Tennis vs. Golf), weather conditions (say cloudy vs. sunny), time of day (say evening vs. morning), etc., or any combination thereof.

For example, the rule may dictate the derivation 22 of different background templates upon different types of sport events captured in the received 21 video images (say Tennis vs. Golf), different weather conditions (say cloudy vs. sunny), different times of day (say evening vs. morning), etc., or any combination thereof.

Thus, in one example, when an optical sensor or a user input data indicates a sunny weather, there may be derived 22 only a background template based on recent twenty of the received 21 video images and a background template based on recent ten of the received 21 video images, whereas in a more cloudy weather, there may be additionally derived 22 a background template based on recent five of the received 21 video images.

Optionally, the rule used for deriving 22 the background templates, is automatically selected among the two or more predefined rules, according to a characteristic which pertains to the object of interest. The characteristic may be for example, a size or an average speed of the ball or player, as measured during the tennis match (or during previously played tennis matches), or as input (say by a user or administrator), as described in further detail hereinabove.

Thus, in one example, with a different size or average speed of the object of interest, a different one or two of the above made example's three background templates may be calculated.

Optionally, the rule used for deriving 22 the background templates, is automatically selected among the two or more predefined rules, according to a characteristic which pertains to the background, say the background's being more static (say a fence or gate) as apposed to the background's being less static (say an audience of sport fans).

Optionally, the background's being more static or less static is determined by the object extractor 15 of the apparatus 10, say based on data input by a user of the apparatus 10, based on processing of audio input originating from the audience areas, etc., as described in further detail hereinabove.

Thus, in one example, with a different size or average speed of the object of interest, a different one or two of the above made example's three background templates may be derived 22.

Figure 3:
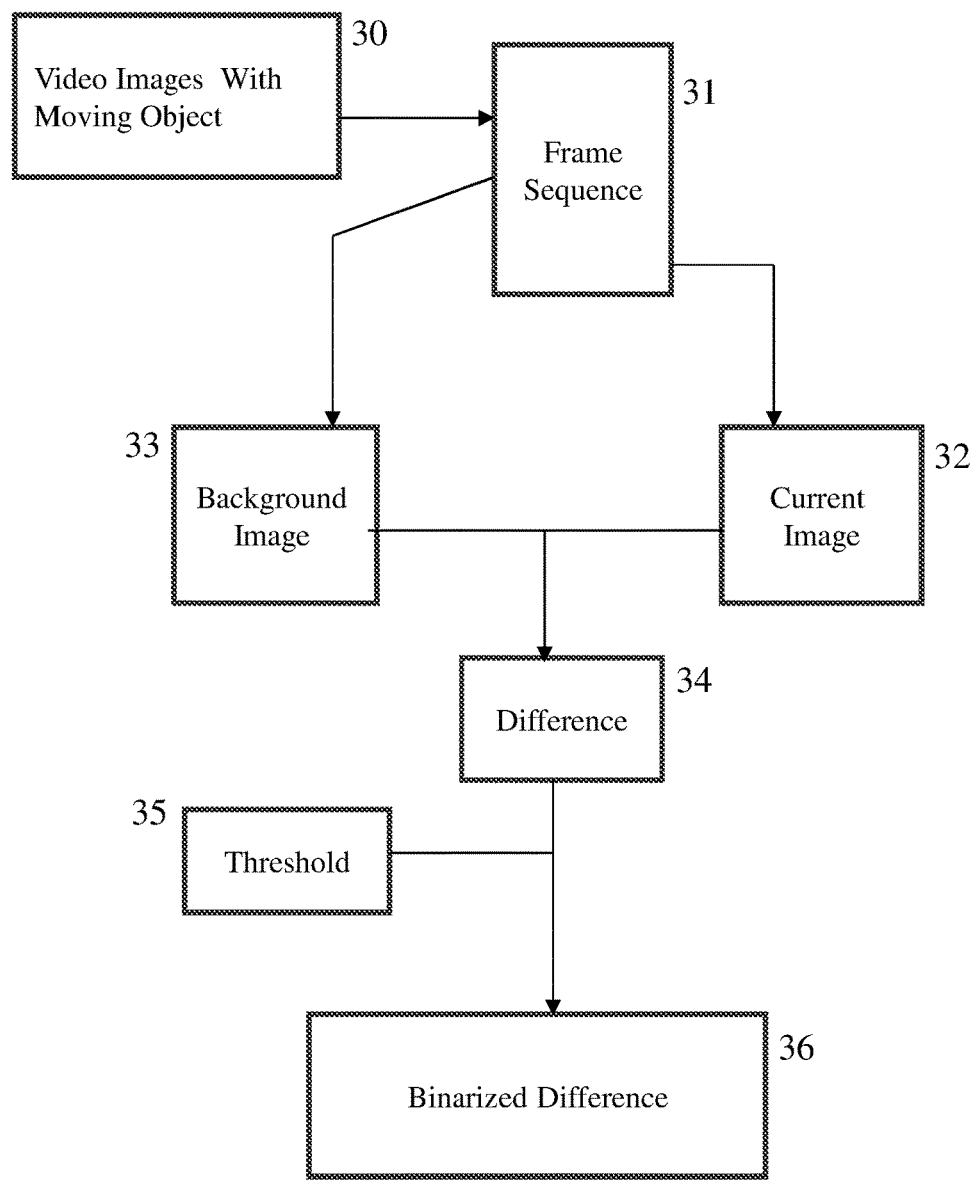
FIG. 3 is a simplified flowchart schematically illustrating a second exemplary method for object extraction from video images, according to an exemplary embodiment of the present invention.

Reference is now made to FIG. 3, which is a simplified flowchart schematically illustrating a second exemplary method for object extraction from video images, according to an exemplary embodiment of the present invention.

A second exemplary method for object extraction from video images, according to an exemplary embodiment of the present invention, may be executed by a computer—as described in further detail hereinabove.

In one example, for carrying out the exemplary method, the computer communicates with one or more cameras, through the internet, an intranet network, a local area network, another network, or any combination thereof. The computer received from the camera, a sequence of video images 31 (i.e. frames) made of images 30 of a moving object (say a player running in a football field) as captured live during a sport event, by the camera, as described in further detail hereinabove.

The second exemplary method aims at extracting the moving object from a current image 32 of the sequence of video images 31, as received, i.e. from the most recently received one of the sequence's images 31, in real time or in near real time.

In the second method, there is used a method of one of current background subtraction methods, for deriving a background template 33 (say a in a form of an image) from images of the video sequence 31, say by the background template deriver 12, as described in further detail hereinabove.

Then, a difference 34 is calculated between the current image 32 and the background template 33, and subjected to binarization using a threshold 35, as described in further detail hereinbelow.

In one example, all images of the video stream 31 are grayscale digital images.

In the example, each pixel in the background template 33 is derived by averaging over grayscale intensity values of all pixels of a same position, in the video sequence's images 31 used for deriving the background template 33 (say in the images received prior to the current image 32).

In the example, a difference 34 is calculated between the current image 32, and the background template 33. The resultant difference 34 is in a form of an image of a same size as of each one of the sequence's images 31.

In the difference 34, each pixel's grayscale intensity value equals the difference between the current image's 32 grayscale intensity in that pixel (i.e. in the same position) and the average intensity for that pixel's position, as indicated in the background template 33 (say the grayscale intensity of the background template 33 in that pixel position).

For binarizing the difference 34, each one of the difference's 34 pixels is compared to a threshold 35. The threshold's 35 value may be set manually—say by a user of apparatus 10, or rather be determined automatically—say according to a rule based on user input or automatically set parameters, such as weather conditions (say cloudy vs. sunny), an average speed of the object of interest (say a ball), a time of day, etc.

In one example, if the grayscale intensity value of the difference's 34 pixel exceeds the threshold 35 value, the pixel's grayscale intensity is set to a value representing a binary '1', say to maximum. Otherwise, the pixel's grayscale intensity is set to a value representing a binary '0', say to minimum.

With the single background template 33, in the resultant single binarized difference 36, each pixel set to a binary '1', is deemed to mark a respective individual (say current) image's 32 pixel position occupied by the object of interest, and the remaining pixels are deemed to mark positions of the individual (say current) image's 32 background.

However, an extraction of an object of interest based on the binarized difference's 36 pixels set to the binary '1', depends on circumstances of capturing of the video images 31. The circumstances may include, for example, a type of a sport event captured in the images 31 (say Tennis vs. Golf), lighting conditions resultant upon different weather conditions (say cloudy vs. sunny), time of day (say evening vs. morning), etc., or any combination thereof.

Reference is now made to FIGS. 4A-4H, which are simplified block diagrams schematically illustrating a first implementation scenario, according to an exemplary embodiment of the present invention.

In one exemplary scenario, a first image is captured during cloudy weather conditions. The first image shows a player 411 who stands next to one or more trees 412 (say in a golf field), under a cloud 413, in the cloudy weather, say on a winter day, as illustrated in FIG. 4A.

Figure 4A:
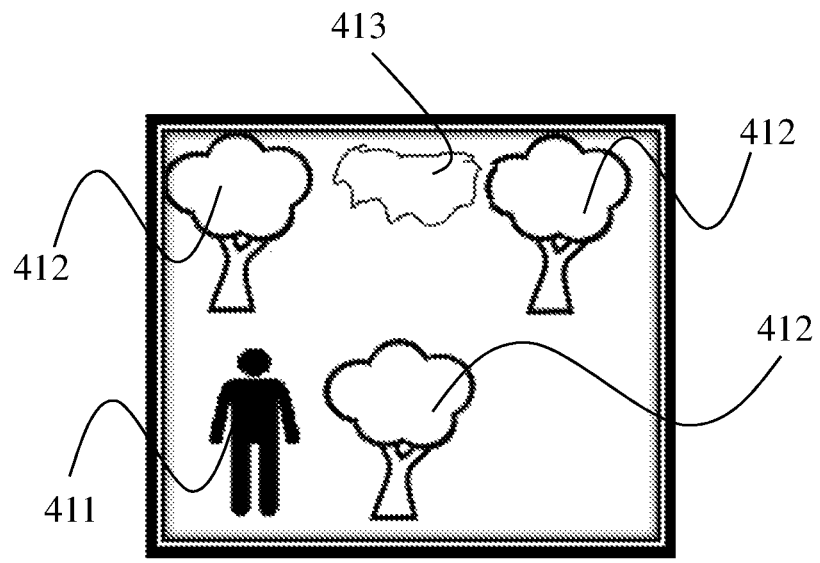
FIGS. 4A-4H are simplified block diagrams schematically illustrating a first implementation scenario, according to an exemplary embodiment of the present invention.
Figure 4B:
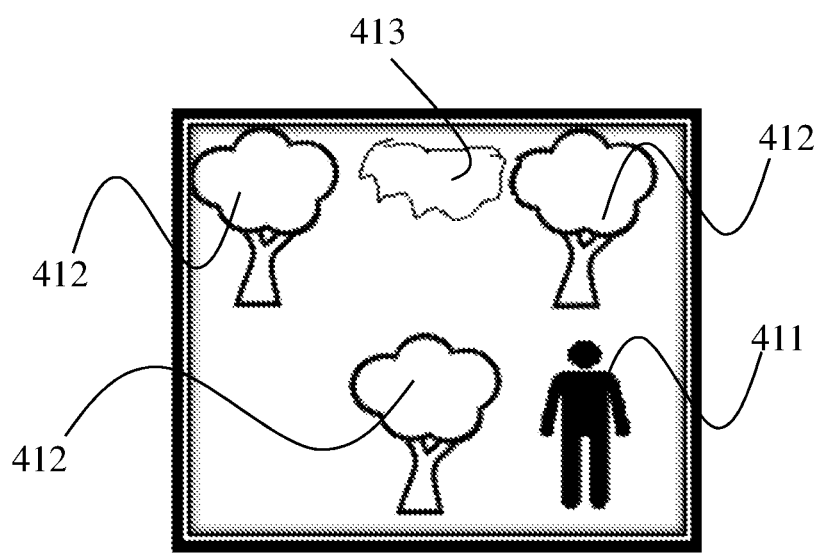

As the player 411 walks around, the player 411 is also captured in later received images, say in an image in which the player 411 is shown standing in another position, next to the trees 412, as illustrated in FIG. 4B.

Figure 4C:
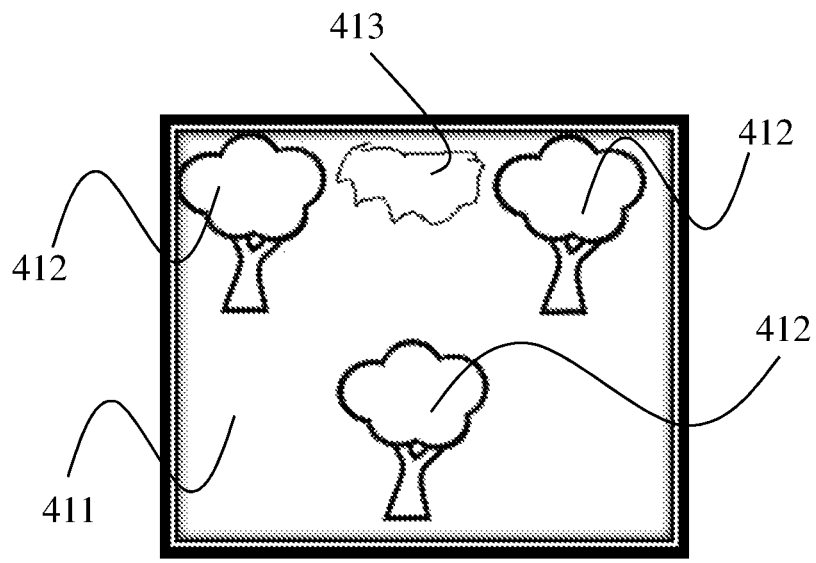

Based on the images in FIG. 4A-4B (possibly, with a number of images received in between the two images), a background template in a form of an image of a same size as of each one of the images in FIG. 4A-4B, is derived from the images in FIG. 4A-4B, as illustrated in FIG. 4C.

As shown in FIG. 4C, the background template derived in the cloudy weather, is rather accurate, as the background template includes only the trees 412 and cloud 413, which form a background against which, the player 411 walks around.

Figure 4D:
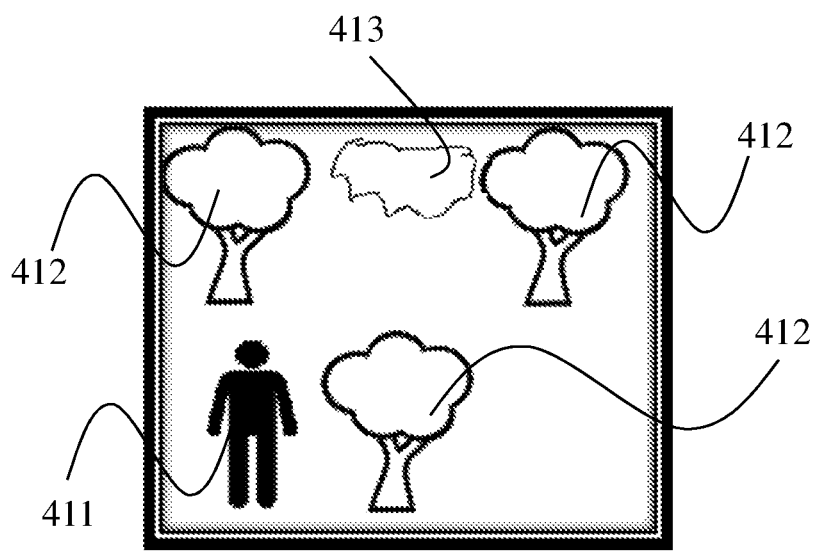

In the exemplary scenario, the player 411 walks back, and is captured in another image, as illustrated in FIG. 4D.

Figure 4E:
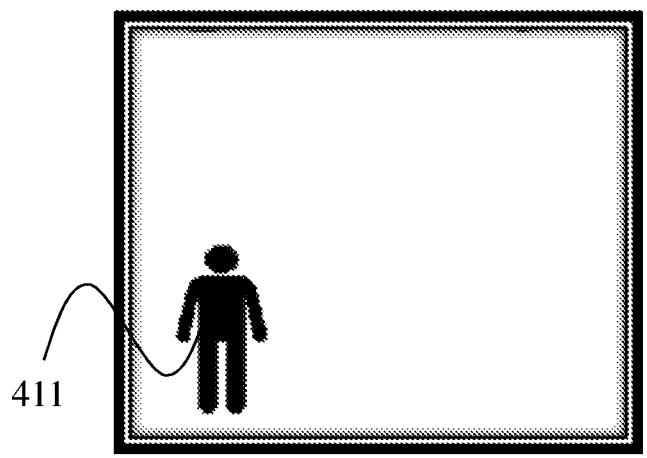

Consequently, a difference may be calculated between the image illustrated in FIG. 4D and the background template illustrated in FIG. 4C, which difference is useful, for extracting an object of interest, say the player 411 standing at a position left to the trees 412, as illustrated in FIG. 4E.

However, as explained hereinabove, the results of the extraction of the object of interest depend on circumstances of capturing of the video images, say on the lighting conditions resultant upon different weather conditions (say cloudy vs. sunny), on a different time of day (say evening vs. morning), etc., or any combination thereof.

Figure 4F:
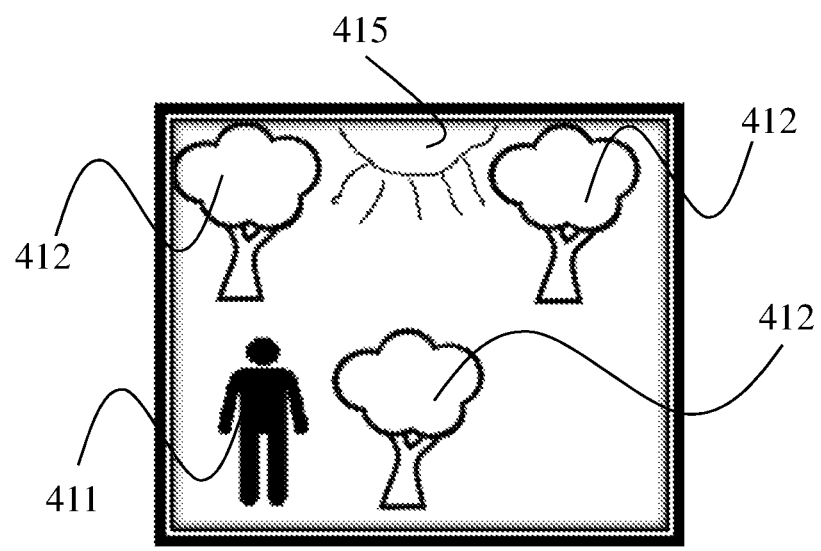

For example, when the weather turns sunny, as the sun comes out from behind the clouds, the player 411 is captured in another image, which image is illustrated in FIG. 4F. In the image illustrated in FIG. 4F, under the light shed by the sun 415, both the player 411 and the trees 412 have a much brighter appearance than when captured in the previous images (4A-4D).

Figure 4G:
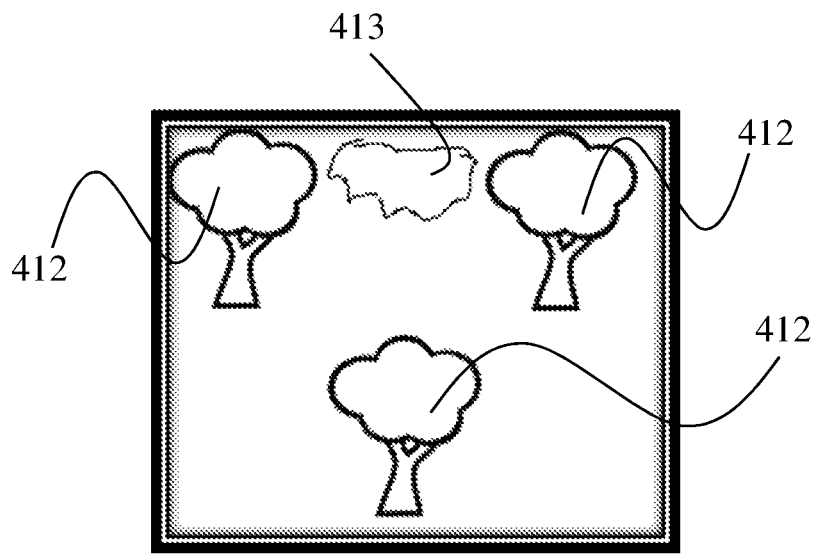

With a law enough rate of updating of the background template, when the player 411 is captured in the image illustrated in FIG. 4F, the background template is still the image based on the cloudy weather conditions derived from the first images, as illustrated in FIG. 4G.

Under the light shed by the sun 415, all pixels of the image captured in the sunny weather, and illustrated in FIG. 4F, are of intensity values which correspond to the much brighter appearance, and therefore, significantly differ from their intensity values in the background template illustrated in FIG. 4G.

Figure 4H:
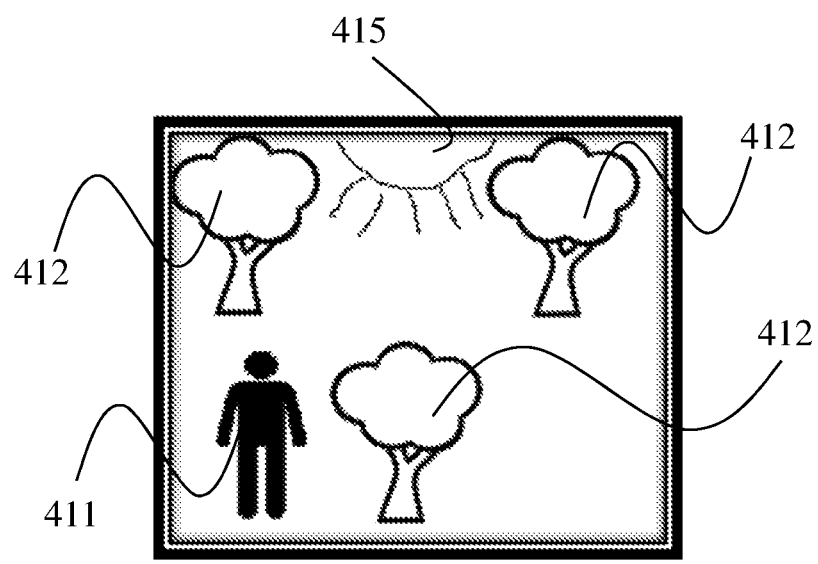

Consequently, a difference calculated between the pixels of the image captured in the sunny weather (FIG. 4F) and the background template (FIG. 4G), shows all objects captured in the sunny weather, and the extraction of the object of interest fails, as illustrated in FIG. 4H.

On the one hand, with a higher rate of updating of the background template, when the image illustrated in FIG. 4F is captured, the background template may already have pixel intensity values which are typical to a much brighter appearance. The background template may already have pixel intensity values typical to a much brighter appearance, because the background template may be, at least partially, based on more sunny ones of the images, as captured after the sun goes out. Consequently, the extraction of the object of interest may be successful.

However, the same higher rate of updating of the background template may prove less effective when the player's 411 movement is too slow, such that the player 411 is caught in the background template, as described in further detail and illustrated using FIG. 6E hereinbelow.

Exemplary embodiments of the present invention extract the object of interest, using two or more background templates. Each one of the background templates may be derived according to methods of different background subtraction techniques, according to different parameter values (say different update rates), etc., or any combination thereof, as descried in further detail hereinabove.

Potentially, by combining methods of different background subtraction techniques and/or different parameter values, there may be yielded, an optimized result, as described in further detail hereinabove.

Figure 5:
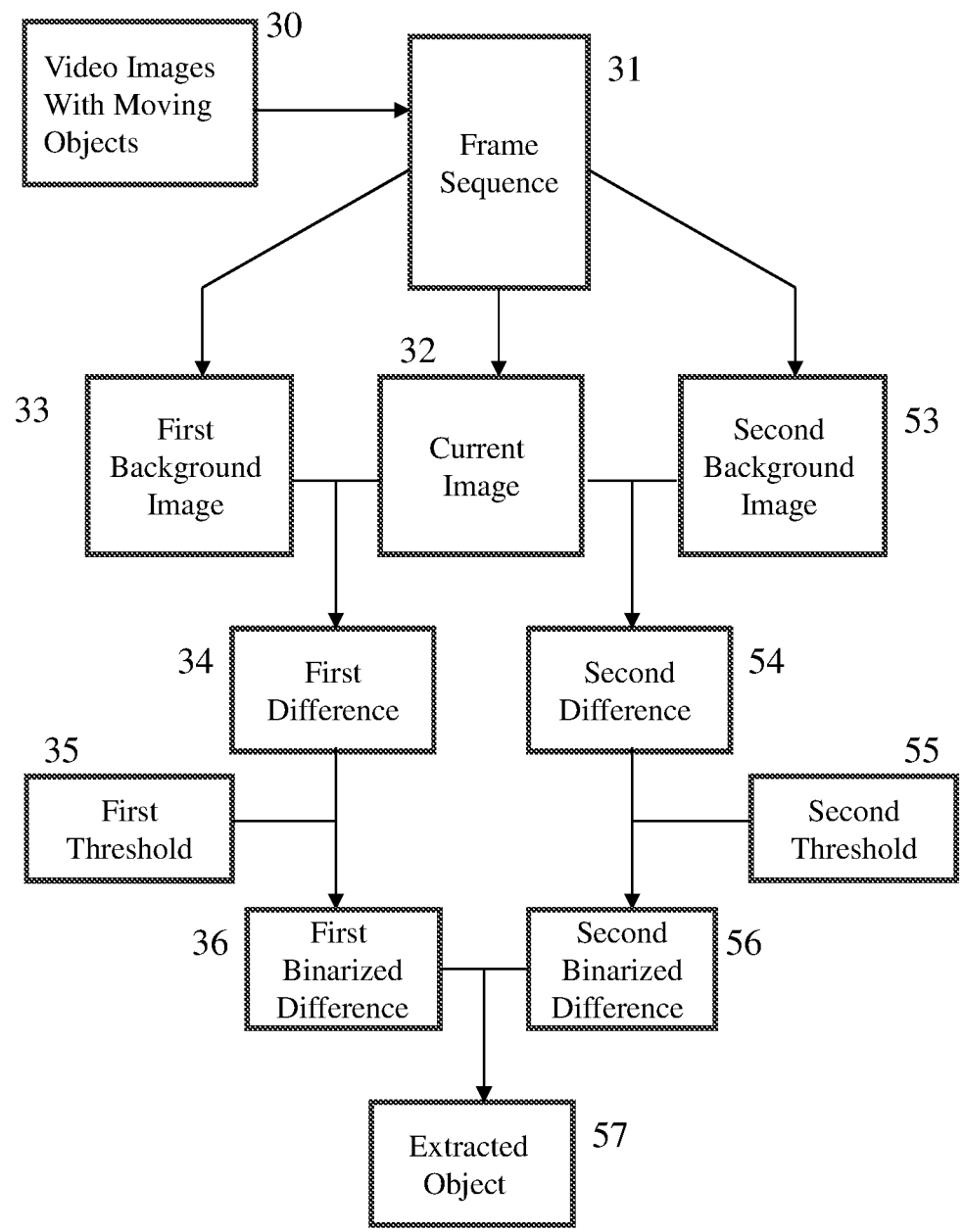
FIG. 5 is a simplified flowchart schematically illustrating a third exemplary method for object extraction from video images, according to an exemplary embodiment of the present invention.

Reference is now made to FIG. 5, which is a simplified flowchart schematically illustrating a third exemplary method for object extraction from video images, according to an exemplary embodiment of the present invention.

A third exemplary method for object extraction from video images, according to an exemplary embodiment of the present invention, may be executed by a computer—as described in further detail hereinabove.

In one example, for carrying out the exemplary method, the computer communicates with one or more cameras, through the internet, an intranet network, a local area network, another network, or any combination thereof, for receiving a sequence of video images 31 (i.e. frames). The sequence of video images 31 is made of images 30 of a moving object (say a player running in a football field) captured live during a sport event, by the cameras, as described in further detail hereinabove.

The exemplary method aims at extracting the moving object from a current image 32 of the sequence of video images 31, as received, i.e. from the most recently received one of the sequence's images 31, in real time or in near real time.

In the exemplary method, there is used a method of one of the current background subtraction methods, for deriving two or more background templates 33, 53 (say a in a form of images) from images of the video sequence 31, say by the background template deriver 12, as described in further detail hereinabove.

Each one of the background templates 33, 53 may be derived according to methods of different current background subtraction techniques, different parameter values used when implementing the methods (say different update rates or an at least partially different subset of the video images), etc., as described in further detail hereinabove.

Then, a difference 34, 54 is calculated between the current image 32 and each one of the background templates 33, 53, and is subjected to binarization using a threshold 35, 55, thus yielding a binarized difference 36, 56, as described in further detail hereinabove.

Subsequently, one or more of the binarized differences 36, 56, is used to extract an object of interest (say the player) 57 from the current image 32, say using a logical conjunction applied on the binarized difference 36, 56, or rather using another rule, as described in further detail hereinabove.

The rule used for extracting the object of interest 57 may be selected by a user or an administrator of apparatus 10, or rather be selected automatically, say by the object extractor 15, as described in further detail hereinabove.

More specifically, in the example, the sequence of video images 31 received, say by the video image receiver 11 of apparatus 10, is made of grayscale digital video images.

In the example, each one of the background templates 33, 53 is calculated by averaging over grayscale intensity values of pixels in a same position in a subset which consists of recent twenty of the received video stream's 31 images.

In the example, every ten seconds, the background template deriver 12 updates a first one of the background templates 33, by discarding one image of earliest receipt among the twenty images used for deriving the first background template, from the subset, and adding an image received by the video image receiver 11 immediately before the updating, to the subset. Then, the background template deriver 12 derives (i.e. re-calculates) the first background template 33 again, according to the thus updated subset of twenty images. Thus, the background template deriver 12 derives the first background template 33 dynamically, with an update rate of ten seconds.

However, in the example, every two seconds, the background template deriver 12 updates a second one of the background templates 53, by discarding one image of earliest receipt among the twenty images used for deriving the second background template, from the subset, and adding an image received by the video image receiver 11 immediately before the updating, to the subset. Then, the background template deriver 12 derives (i.e. re-calculates) the second background template 53 again, according to the thus updated subset of twenty images. Thus, the background template deriver 12 derives the second background template 53 dynamically, with an update rate of two seconds.

In the example, a difference 34, 54 is calculated between the current image (i.e. the most recent image) 32 and each one of the background templates 33, 53, respectively, thus calculating a difference 34, 54 per each one of the two background templates 33, 53. Each one of the resultant differences is in a form of an image of a same size as of each one of the received video stream's 31 images.

In the difference, each pixel's grayscale intensity value equals the difference between the current image's 32 grayscale intensity in that pixel (i.e. in the same position) and the average intensity for that pixel's position, as indicated in the respective, background template 33, 53 (say the grayscale intensity of the background template in that pixel position).

For binarizing each one of the differences 34, 54, each one of the difference's 34, 54 pixels is compared to a threshold 35, 55. The threshold 35 used for binarizing the first difference 34 may be the same or different from the threshold 55 used for binarizing the second difference 54. Each one of the thresholds' 35, 55 values may be set manually—say by a user of apparatus 10, or rather be determined automatically—say according to a rule based on user input or automatically set parameters, such as weather conditions (say cloudy vs. sunny), an average speed of the object of interest (say a ball), a time of day, etc.

In one example, if the grayscale intensity value of the difference's 34, 54 pixel exceeds the threshold value 35, 55, the pixel's grayscale intensity is set to a value representing a binary '1', say to maximum. Otherwise, the pixel's grayscale intensity is set to a value representing a binary '0', say to minimum.

Then, in accordance with a rule selected in the instant example, a logical conjunction is applied among the two resultant binarized differences 36, 56, for extracting the object of interest 57. Each pixel set to a binary '1' in both binarized differences 36, 56, is deemed to mark a respective current image's 32 pixel position occupied by the object of interest 57. The remaining pixels are deemed to mark positions of the current image's 32 background, as described in further detail hereinabove.

Thus, in the instant example, a logical conjunction of the binarized differences 36, 56 results in a binary (say black and white) image which maps the current image's area which is occupied by the object of interest 57.

Figure 6A:
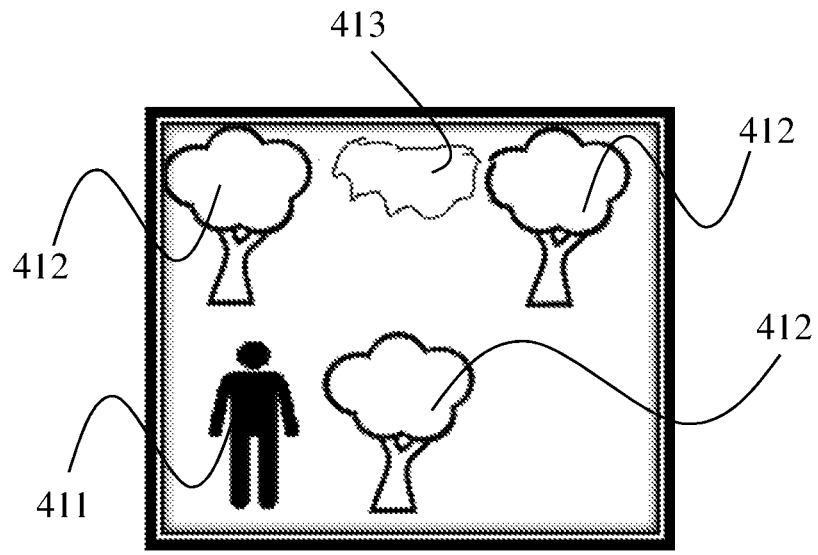
FIGS. 6A-6O are simplified block diagrams schematically illustrating a second implementation scenario, according to an exemplary embodiment of the present invention.
Figure 6B:
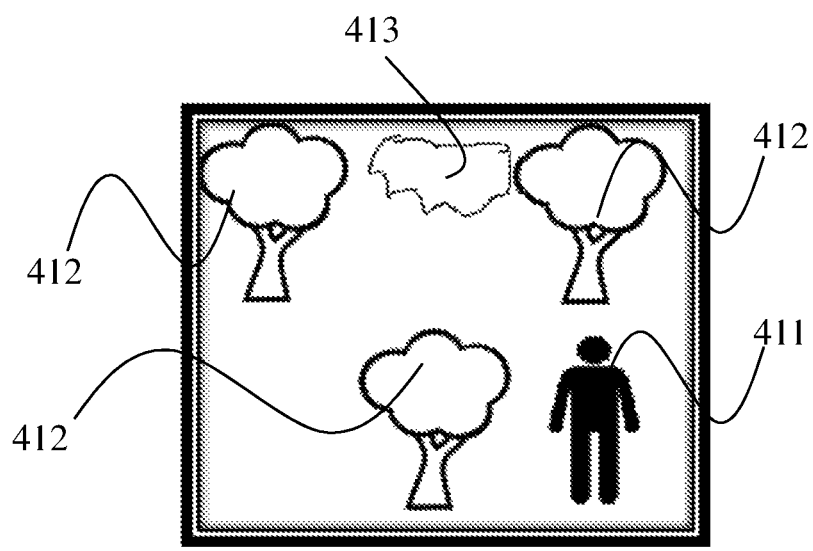
FIG. 6B illustrates a player stands in a right position next to one or more trees and a cloud.
Figure 6C:
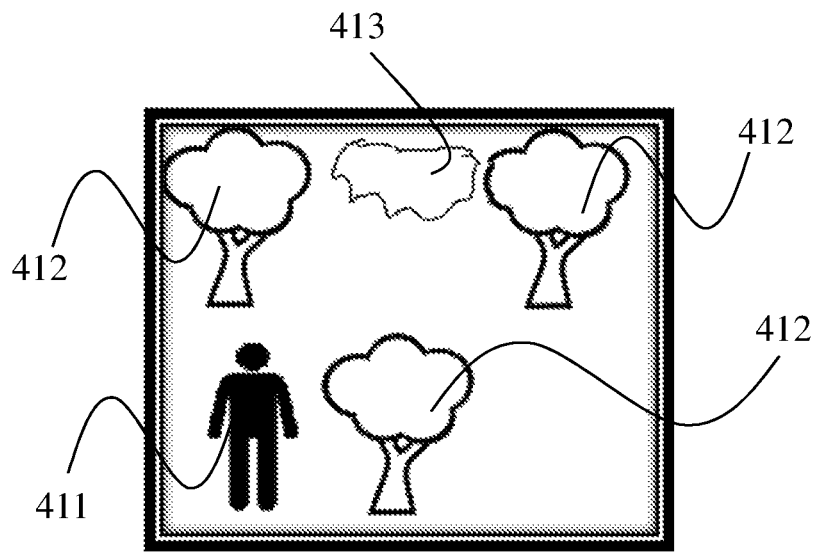
FIG. 6C illustrates a player who stands in a left position next to one or more trees and a cloud.
Figure 6D:
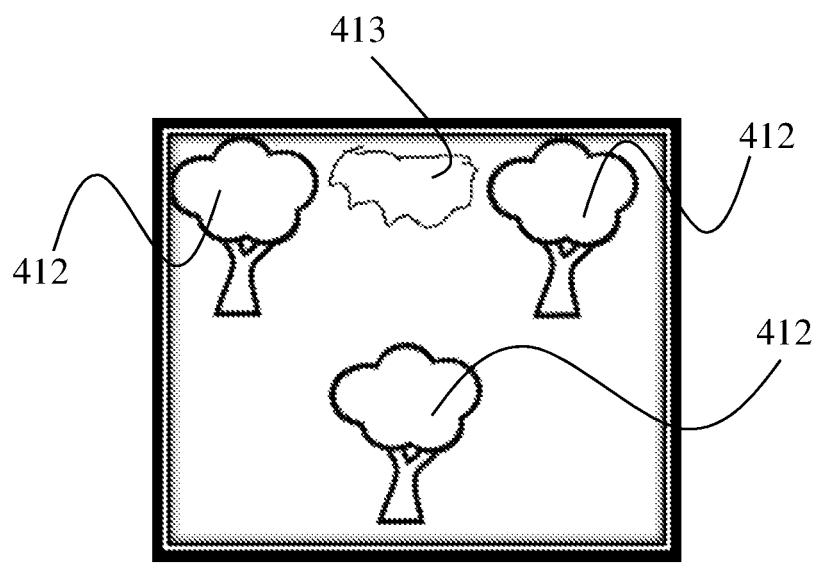
FIG. 6D is a background template containing one or more trees and a cloud. It does not include the image of a player.
Figure 6E:
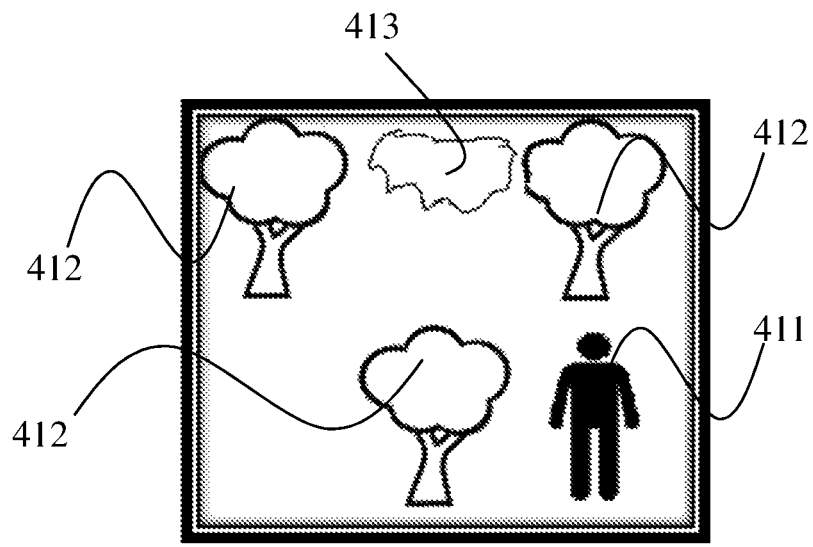
FIG. 6E is a background template containing one or more trees and a cloud. It also includes the image of a player in the right position.
Figure 6F:
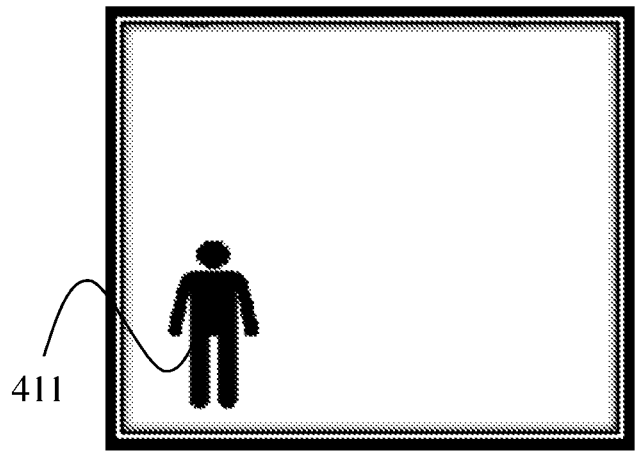
FIG. 6F illustrates a player standing in a left position.
Figure 6G:
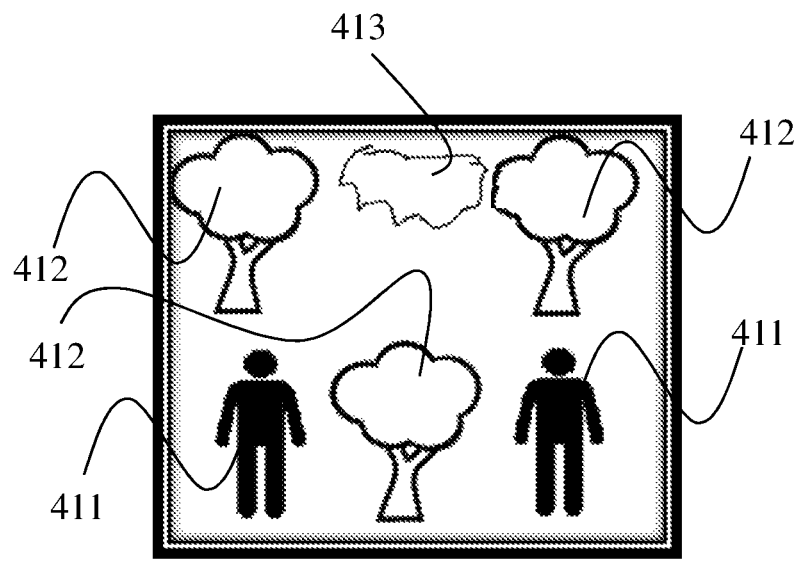
FIG. 6G is a background template containing one or more trees and a cloud. It also includes the image of a player in the right position and a player in the left position.
Figure 6H:
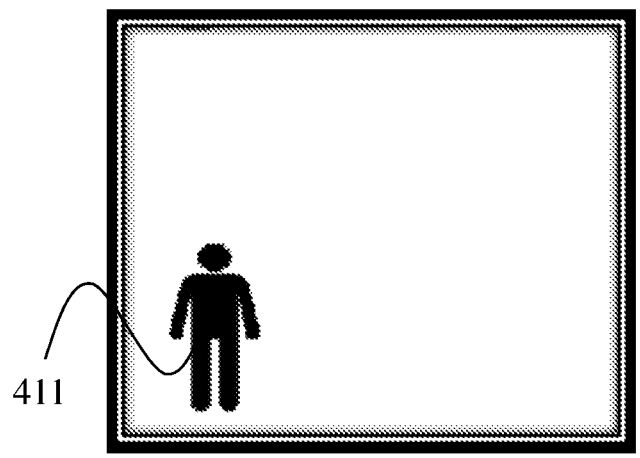
FIG. 6H illustrates a player who stands in a left position.
Figure 6I:
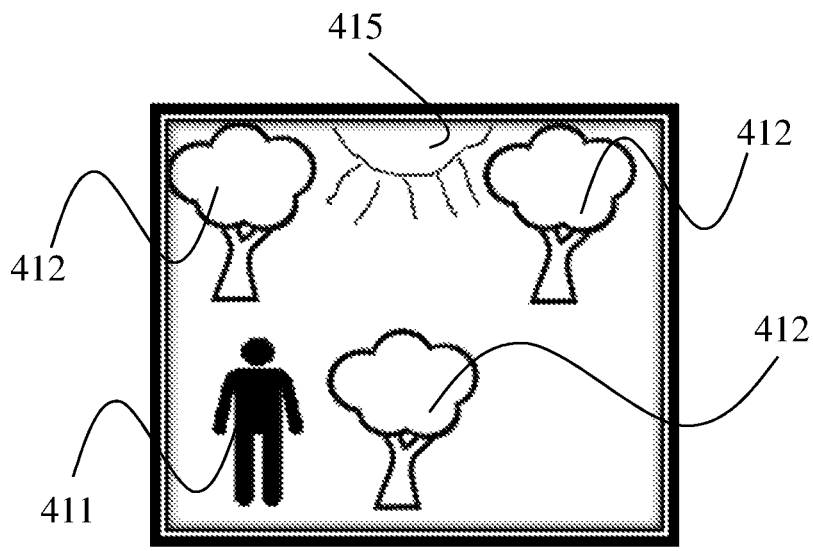
FIG. 6I illustrates a player who stands in a left position next to one or more trees and the sun.
Figure 6J:
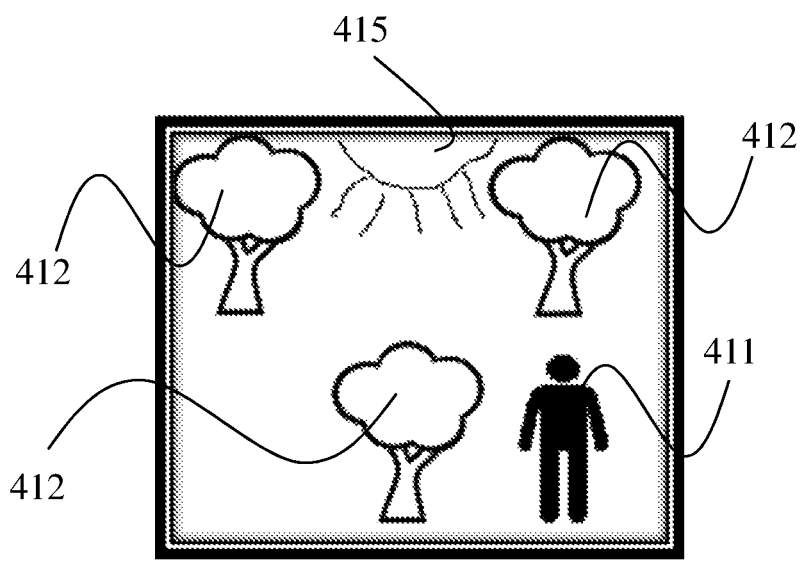
FIG. 6J illustrates a player who stands in a right position next to one or more trees and the sun.
Figure 6K:
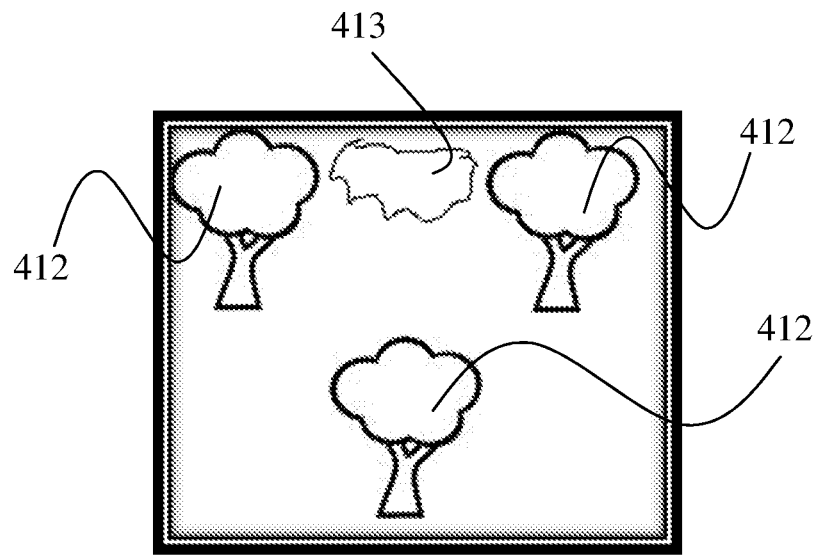
FIG. 6K is a background template containing one or more trees and a cloud. It does not include the image of a player.
Figure 6L:
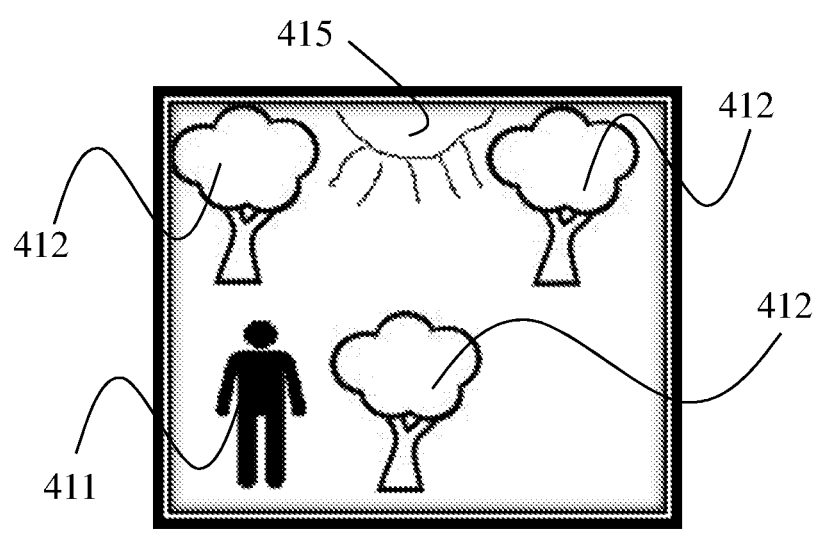
FIG. 6L illustrates a player who stands in a left position next to one or more trees and the sun.
Figure 6M:
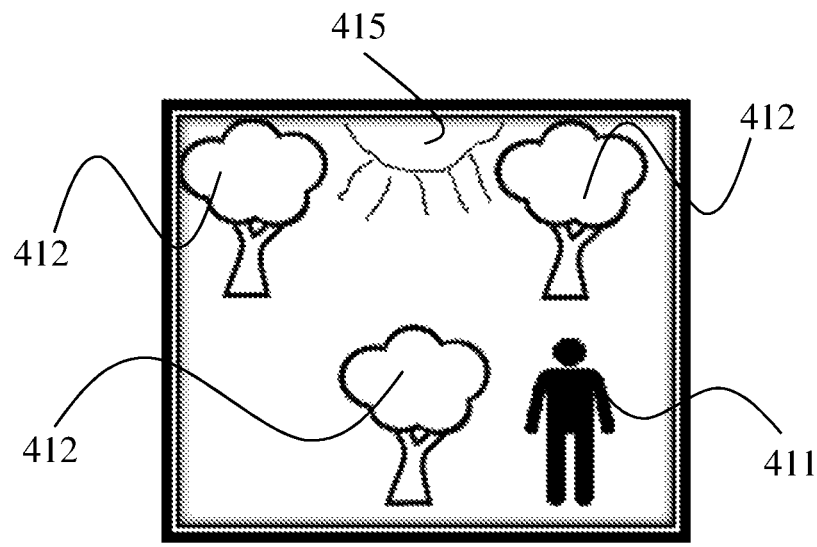
FIG. 6M illustrates a player who stands in a right position next to one or more trees and the sun.
Figure 6N:
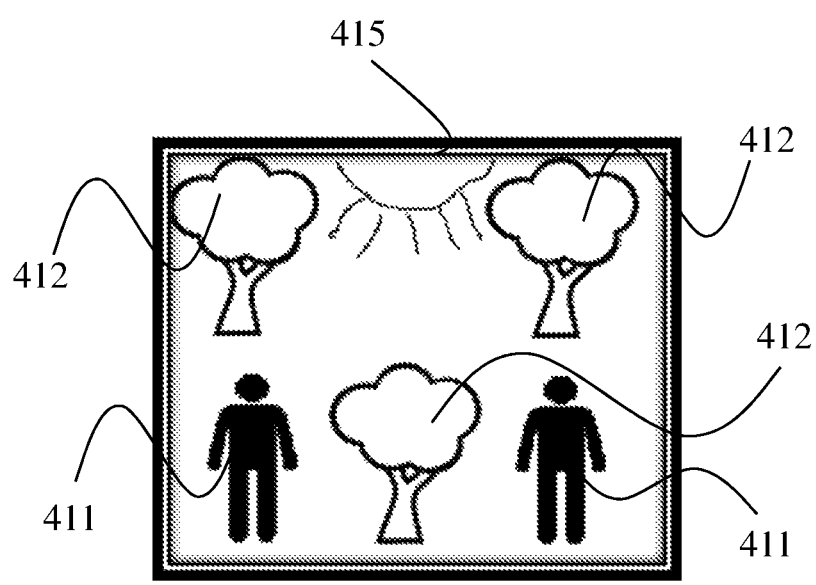
FIG. 6N is a background template containing one or more trees and a cloud. It also includes the image of a player in a right position and a player in a left position.
Figure 6O:
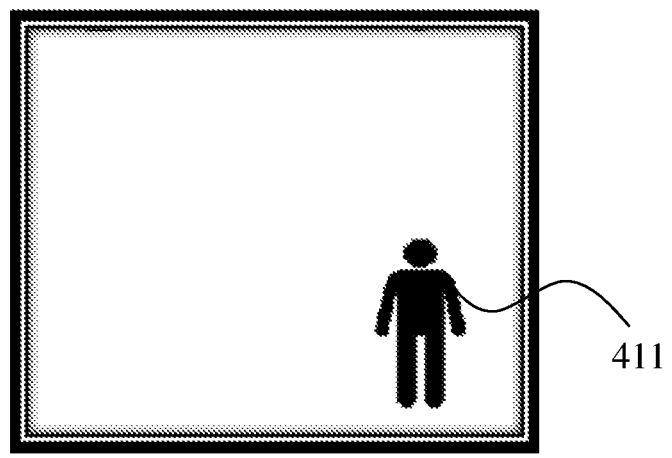

Reference is now made to FIG. 6A-6O, which are simplified block diagrams schematically illustrating a second implementation scenario, according to an exemplary embodiment of the present invention.

In one exemplary scenario, a sequence of video images is captured during partially cloudy and partially sunny weather conditions, and fed to apparatus 10, as described in further detail hereinabove.

A first one of the video is an image of a player 411 standing next to trees 412 (say in a golf field), under a cloud 413, in a left position, as illustrated in FIG. 6A.

As the player 411 walks around, the player 411 is captured in later received images. For example, in one later received image, the player 411 is captured standing in a right position, next to the trees 412, and under the cloud 413, as illustrated in FIG. 6B.

In a yet later received image, the player 411 is shown again, standing in the left position, next to the trees 412, and under the cloud 413, as illustrated in FIG. 6C.

In the instant example, during receipt of the video images, there are simultaneously derived two background templates from the video images, say by analyzing movement of objects which appear in the video images.

However, a first one of the background templates is an image derived (i.e. re-calculated) dynamically with an update rate of once in ten seconds, whereas a second one of the background templates is an image which is also derived dynamically, but rather with an update rate of once in two seconds, as described in further detail hereinabove.

In the example, when the image illustrated in FIG. 6C is received, say by the video image receiver 11, due the different update rates, the first background template may be based on a subset of the video images, which subset is less recent than a subset of the video images which the second background template is based on.

Thus, as shown in FIG. 6D, the first background template is rather accurate, as the first background template includes the trees 412 and cloud 413, but does not include the object of interest (i.e. not the player 411).

However, as shown in FIG. 6E, the second background template is less accurate, as the second background template includes the trees 412 and cloud 413, as well as the object of interest (i.e. the player 411 in the right position). Thus, in the example, due to a standing or slow movement of the player 411, the second background template is less accurate than the first background template.

In the example, a first difference is calculated between the image shown in FIG. 6C when that image is also the last image received by the video image receiver 11 (i.e. the current image), and the first background template as shown in FIG. 6D, and subjected to binarization, as described in further detail hereinabove.

The resultant first binarized difference is rather accurate, as illustrated in FIG. 6F, and shows only the object of interest (say the player 411).

Further in the example, a second difference is calculated between the image in FIG. 6C (i.e. the current image) and the second background template as shown in FIG. 6E, and subjected to binarization, as described in further detail hereinabove.

The resultant second binarized difference is less accurate, as illustrated in FIG. 6G, and shows the object of interest (in both positions), as well as the trees 412 and cloud 413.

Then, a logical conjunction applied on the two binarized differences, yields the image shown in FIG. 6H, thus extracting the object of interest (i.e. the player 411 of the instant example).

Then, the weather turns sunny, and an image received after the image shown in FIG. 6C, shows the player 411 when standing in a position left to one of the trees 412, under the sun 415, as illustrated in FIG. 6I.

An image received after the image illustrated in FIG. 6I, shows the player 411 back at a position right to the same one of the trees 412, under the sun 415, as illustrated in FIG. 6J.

Again, when the image illustrated in FIG. 6J is received, say by the video image receiver 11, due to the different update rates, the first background template is based on a subset of the video images, which subset is less recent than a subset of the video images which the second background template is based on.

Thus, as shown in FIG. 6K, the first background template includes the trees 412 and the cloud 413, and does not include the object of interest (i.e. not the player 411). However, the first background template's pixel intensity values are significantly different than the pixel intensity values of the image shown in FIG. 6J, which is captured in the sunny weather conditions, and is thus much brighter and free of clouds 413, compared to the cloudy images which the first background template is based on.

As shown in FIG. 6L, due to a standing or slow movement of the player 411, the second background template still includes the trees 412 and sun 415, as well as the object of interest (i.e. the player 411 in the left position). However, due to a higher update rate, the second background template's pixel intensity values are closer to the pixel intensity values of the images shown in FIGS. 6I and 6J, which are captured in the sunny weather conditions, and are much brighter, and free of clouds 413.

In the example, a first difference is calculated between the image shown in FIG. 6J when that image is also the last image received by the video image receiver 11 (i.e. the current image), and the first background template as shown in FIG. 6K, which is of a more cloudy and thus less bright appearance, and subjected to binarization, as described in further detail hereinabove.

The resultant first binarized difference shows the object of interest (say the player 411) as well as the trees 412 and sun 415, as illustrated in FIG. 6M.

Further in the example, a second difference is calculated between the image in FIG. 6J (i.e. the current image) and the second background template as shown in FIG. 6L, and subjected to binarization, as described in further detail hereinabove.

In the example, the resultant second binarized difference is even less accurate, and shows the object of interest twice (one time per each of the two positions at which the player 411 is captured) as well as the trees 412 and sun 415, as illustrated in FIG. 6N.

However, a logical conjunction applied on the two binarized differences, yields the image shown in FIG. 6O, which shows only the object of interest (i.e. the player 411 of the instant example), standing at the right position (as in the image illustrated in FIG. 6J), thus successfully extracting the object of interest (i.e. the player 411 of the example).

Figure 7:
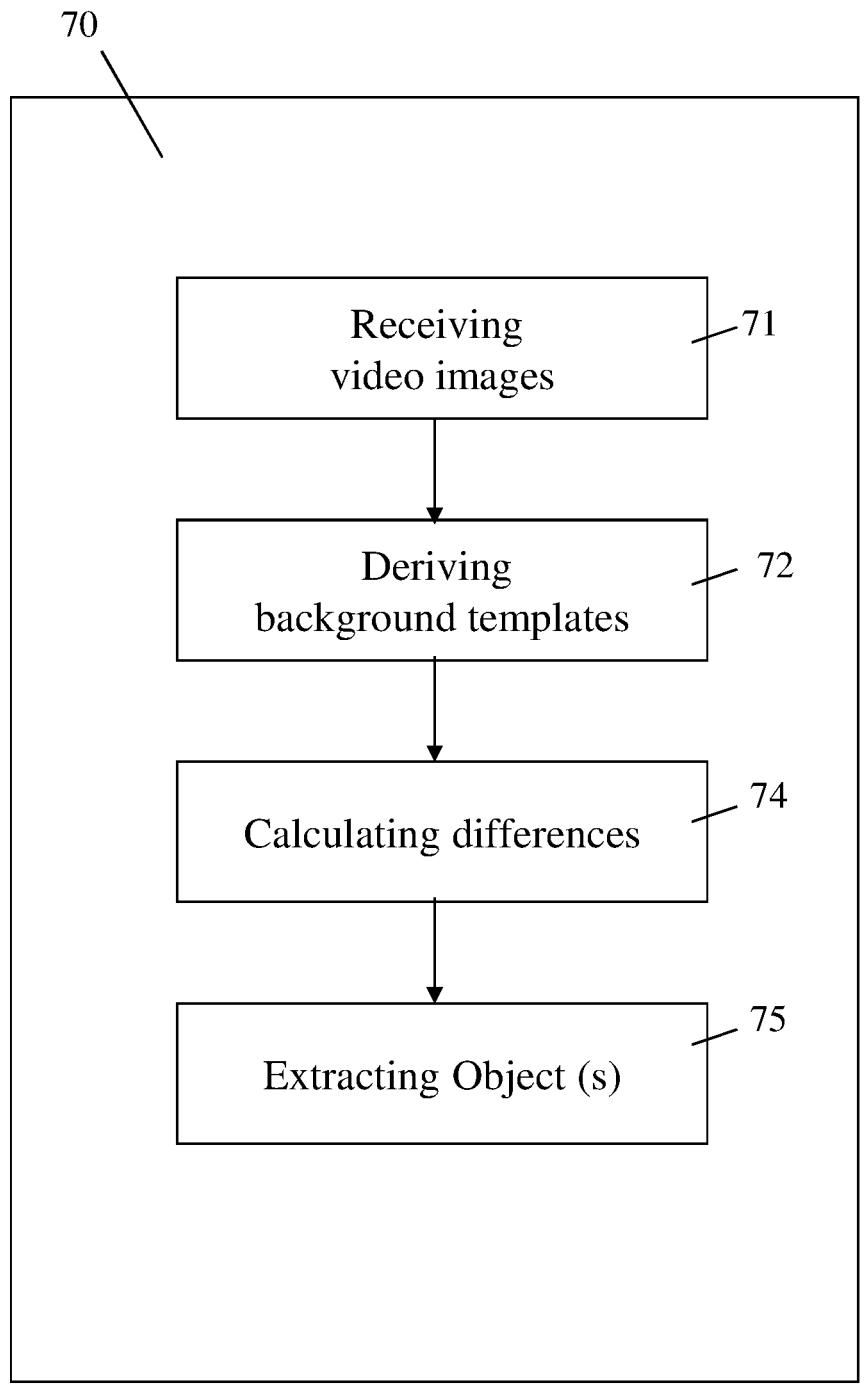
FIG. 7 is a block diagram schematically illustrating an exemplary computer readable medium storing computer executable instructions for performing steps of object extraction from video images, according to an exemplary embodiment of the present invention.

Reference is now made to FIG. 7, which is a block diagram schematically illustrating an exemplary computer readable medium storing computer executable instructions for performing steps of object extraction from video images, according to an exemplary embodiment of the present invention.

According to an exemplary embodiment of the present invention, there is provided a non-transitory computer readable medium 70, such as a CD-ROM, a USB-Memory, a Hard Disk Drive (HDD), a Solid State Drive (SSD), etc.

The computer readable medium 70 stores computer executable instructions, for performing steps of controlling cameras in a sport event. The instructions may be executed upon one or more computer processors.

The computer executable instructions include a step of receiving 71 one or more video images, as described in further detail hereinabove.

In one example, the step includes receiving 71 a live video stream of images captured live by one or more cameras during a tennis match, one or more stills images which capture the empty tennis court before the match begins and the court, ball and players during the match, etc.

The computer executable instructions further include a step of deriving 72 two or more background templates from the received 71 video images.

Optionally, the background templates are derived 72 using one or more current background subtraction methods, as described in further detail hereinabove.

Optionally, each one of at least two of the background templates is derived 72, using a respective and different one of a plurality of background calculation methods.

Optionally, each one of at least two of the background templates is derived 72 using a respective and at least partially different subset of the received 71 video images.

For example, each one of at least two of the background templates may be derived 72 using a respective and at least partially less recent subset of the received 71 video images. Thus, in one example, a first one of the background templates is derived 72 from recent twenty of the received 71 video images, whereas a second one of the background templates is derived 72 from recent thirty of the received 71 video images. Consequently, the second background template's thirty images include ten images which are less recent than the first background template's twenty images. The second background template is thus at least partially less recent than the first background template.

Optionally, each one of at least two of the background templates is derived 72 using a respective and different frequency of sampling of the received 71 video images, be the frequency based on time, on order of receipt 71, etc., as described in further detail hereinabove.

Thus, in one example, a first background template is derived 72 from ten of the received 71 images of a received 71 sequence of video images, say images streamed from a camera, as described in further detail hereinabove. Each one of the ten images is an image received 71 a couple of seconds before the next one of the ten images (say with a number of images received 71 in between the two images).

In the example, a second background template is also derived 72 from ten of the received 71 video images. However, each one of the ten images which the second background template is derived 72 from, is an image received 71 three seconds before the next one of the ten images (i.e. with a greater number of images received 71 in between the two images).

Similarly, in another example, a first background template is derived 72 from twenty of the received 71 video images of a sequence of video images, say the images streamed from the camera, as described in further detail hereinabove. In the example, the twenty images include each tenth image streamed from the camera, thus each one of the twenty images is an image received 71 tenth in the sequence, after an image added earlier to the twenty images.

In the example, a second background template is also derived 72 from twenty of the received 71 video images. However, the twenty images include each fifth image, thus each one of the twenty images is an image received 71 fifth in the sequence streamed from the camera, after an image added earlier to the twenty images.

Optionally, each one of at least two of the background templates is derived 72 using a respective and different in size subset of the received 71 video images, as described in further detail hereinabove.

Thus, in one example, a first one of the background templates is derived 72 from twenty of the received 71 video images, whereas a second one of the background templates is derived 72 from ten of the received 71 video images, as described in further detail hereinabove.

Optionally, the computer executable instructions further include instructions of updating each one of at least two of the background templates, with a respective and different update rate.

Thus, in one example, a first background template is derived 72 from a subset which consists of twenty of the received 71 video images. Every ten seconds, the first background template is updated by discarding one image of earliest receipt 71 among the twenty images, and adding an image received 71 immediately before the updating, to the subset.

Then, the first background template is derived 72 again (i.e. re-calculated), according to the thus updated subset of twenty images. Thus, the first background template is derived 72 dynamically, with an update rate of ten seconds.

In the example, a second background template is derived 72 from a subset which also consists of twenty of the received 71 video images. Every five seconds, the second background template is updated by discarding one image of earliest receipt 71 among the twenty images, and adding an image received 71 immediately before the updating, to the subset.

Then, the second background template is derived 72 again (i.e. re-calculated), according to the thus updated subset of twenty images. Thus, the second background template is also derived 72 dynamically. However, the second background template is rather derived 72 with an update rate of five seconds.

In one example, the computer executable instructions are used as a part of an implementation of a method for locating objects of interest, such as a ball or a player, during a sport event, and for tracking the movements of the objects of interest, in a three dimensional space which represents a constrained environment, say of a tennis court or a football field, as described in further detail hereinabove.

In the example, there is needed to extract an object of interest (say a tennis ball or a soccer player) from an individual one of the received 71 video images, say from the fed stream of video images' most recent image.

The object of interest is extracted 75 from the individual image, using two or more of the background templates. Each one of the background templates is derived 72 from one or more of the images received 71 prior to that individual, most recent image (i.e. some or all of the sequence's earlier images), as described in further detail hereinbelow.

The computer executable instructions further include a step of calculating 74 a plurality of differences. Each one of the differences is calculated 74 between the individual (say current) video image and a respective and different one of the derived 72 background templates. Thus, the derived 72 background template used for calculating 74 each difference, is a different one.

The computer executable instructions further include a subsequent step in which one or more objects of interest is extracted 75 from the individual video image, using a rule applied on the calculated 74 differences, as described in further detail hereinabove.

The rule serves as a basis for comparison, weighting, or any other pattern of decision making, according to which decision making, the portion of the individual image in which the object of interest is captured, is identified, thus extracting 75 the object of interest from the individual image.

The rule applied on the calculated 74 differences may be selected by a user, or rather be selected automatically, as described in further detail hereinabove.

In one example, the computer executable instructions further comprise a step of binarizing the calculated 74 differences, using a threshold value, and the rule applied on the differences dictates applying logical conjunction among the binarized differences, for extracting 75 the object of interest.

More specifically, in the example, the received 71 video images are grayscale digital images which belong to a same video stream. The individual image is the video stream's most recent image, also referred to hereinbelow as the current image, and each one of the background templates is derived 72 from one or more images of the received 71 video stream.

In the example, each pixel in each one of the background templates is derived 72 by averaging over grayscale intensity values of all pixels of a same position, in a different number of the received 71 video images.

For example, a first background template is derived 72 by averaging over the intensity values of pixels in a same position in recent twenty of the received 71 video images. A second background template is derived 72 by averaging over intensity values of pixels in a same position in recent ten of the received 71 video images. Further, a third background template is derived 72 by averaging over intensity values of pixels in a same position in recent five of the received 71 video images, as described in further detail hereinabove.

In the example, a difference is calculated 74 between the current (i.e. the most recently received 71) image and each one of the three background templates, respectively, thus calculating 74 a difference per each one of the three background templates. The resultant difference is in the form of an image of a same size as of each one of the received 71 video images In the difference, each pixel's grayscale intensity equals the difference between the current image's grayscale intensity in that pixel (i.e. in the same position) and the average intensity for that pixel's position, as indicated in the background template (say the grayscale intensity of the background template in that pixel position).

Optionally, for binarizing the difference, each one of the difference's pixels is compared to a threshold. The threshold's value may be set manually or rather be determined automatically, say according to a rule based on user input or automatically set parameters, such as weather conditions (say cloudy vs. sunny), an average speed of the object of interest (say a ball), a time of day, etc.

In one example, if the grayscale intensity value of the difference's pixel exceeds the threshold value, the pixel's grayscale intensity is set to a value representing a binary '1', say to maximum. Otherwise, the pixel's grayscale intensity is set to a value representing a binary '0', say to minimum.

Then, in accordance with a rule used in the instant example, a logical conjunction is applied among the three binarized differences, for extracting 75 the object of interest. Each pixel set to a binary '1' in all three differences, is deemed to mark a respective current image's pixel position occupied by the object of interest, and the remaining pixels are deemed to mark positions of the current image's background, as described in further detail hereinabove.

That is to say that in the instant example, a logical conjunction of the binarized differences results in a binary (say black and white) image which maps the current image's area which is occupied by the object of interest.

Optionally, the computer executable instructions further include a step of allowing a user to select the rule applied on the calculated 74 differences among two or more rules predefined by a user, administrator, or developer, or rather to select a rule by inputting the rule himself, say using natural language, in a GUI, etc., as described in further detail hereinabove.

Optionally, the rule applied on the calculated 74 differences is automatically selected among two or more alternative rules predefined by a user, administrator, or developer. For example, the rule may be selected according to user input or automatically set parameters, such as weather conditions (say cloudy vs. sunny), an average speed of the object of interest (say a ball), a time of day, etc., as described in further detail hereinabove.

Optionally, the computer executable instructions further include a step of automatically selecting the rule applied on the calculated 74 differences, among the two or more predefined rules, according to circumstances of capturing of the received 71 video images. The circumstances may include, for example, a type of a sport event captured in the video images (say Tennis vs. Golf), weather conditions (say cloudy vs. sunny), time of day (say evening vs. morning), etc., or any combination thereof.

Thus, in one example, when an optical sensor, or a user input data, indicates a sunny weather, the applied rule may give less (or even zero) weight to calculated 74 differences based on background templates derived 72 from a small subset of the received 71 video images. For example, the rule may dictate relying only on the above example's difference based on the background template derived from the recent twenty of the received 71 video images while discarding the background templates derived 72 from ten and five first ones of the received 71 video images.

In another example, when the optical sensor or user input data indicates a partially cloudy weather, the applied rule may give a same weight to differences based on background templates derived 72 from subsets of different sizes, say by relying on a logical conjunction applied on the above example's three differences.

In yet another example, when the optical sensor indicates a cloudy weather, the applied rule may be based on only two of the above example's differences, say on a logical conjunction applied only on the above example's two differences which are based on the background templates derived from the ten and five received 71 video images.

Optionally, the computer executable instructions further include a step of automatically selecting the rule applied on the calculated 74 differences, among the two or more predefined rules, according to a characteristic which pertains to the object of interest. For example, the rule applied on the calculated 74 differences may be automatically selected according to a size or an average speed of the object of interest (say a ball or player), as measured during the tennis match (or during previously played tennis matches), or as input by a user, as described in further detail hereinabove.

Thus, in one example, with a different size or average speed of the object of interest, a different one or two of the above made example's three calculated 74 differences, may be used, to extract 75 the object of interest, say using a Boolean or other rule applied on the one or two differences, as described in further detail hereinabove.

Optionally, the computer executable instructions further include a step of automatically selecting the rule applied on the calculated 74 differences, among the two or more predefined rules, according to a characteristic which pertains to the background, say the background's being more static (say a fence or gate) as apposed to the background's being less static (say an audience of sport fans).

Optionally, the computer executable instructions further include a step of determining that the background is more static or less static, based on data input by a user, based on processing of audio input which originates from the audience areas, etc.

Thus, in one example, with a background which is less static, one of the calculated 74 differences may be used, to extract 75 the object of interest, whereas with a background which is more static, another one of the calculated 74 differences may be used, to extract 75 the object of interest.

Optionally, the deriving 72 of the background templates is based a rule selected among two or more of predefined rules.

Optionally, the computer executable instructions further include a step of allowing a user to select the rule used for the deriving 72 the background templates, among two or more rules predefined by a user, administrator, or developer, or rather to select the rule by inputting the rule himself, say using natural language and a GUI, as described in further detail hereinabove.

Optionally, the computer executable instructions further include a step of automatically selecting the rule used for the deriving 72 the background templates, among two or more rules predefined by a user, administrator, or developer. For example, the rule may be selected according to user input or automatically set parameters, such as weather conditions (say cloudy vs. sunny), an average speed of the object of interest (say a ball), a time of day, etc.

Optionally, the computer executable instructions further include a step of automatically selecting the rule used for the deriving 72 the background templates, among the two or more predefined rules, according to circumstances of capturing of the received 71 video images. The circumstances may include, for example, a type of a sport event captured in the video images (say Tennis vs. Golf), weather conditions (say cloudy vs. sunny), time of day (say evening vs. morning), etc., or any combination thereof.

For example, the rule may dictate the derivation 72 of different background templates upon different types of sport events captured in the received 71 video images (say Tennis vs. Golf), different weather conditions (say cloudy vs. sunny), different times of day (say evening vs. morning), etc., or any combination thereof.

Thus, in one example, when an optical sensor, or a user input data, indicates a sunny weather, there may be derived 72 only a background template based on recent twenty of the received 71 video images and a background template based on recent ten of the received 71 video images, whereas in a more cloudy weather, there may be additionally derived 72 a background template based on recent five of the received 71 video images.

Optionally, the computer executable instructions further include a step of automatically selecting the rule used for deriving 72 the background templates, among the two or more predefined rules, according to a characteristic which pertains to the object of interest, say a size or an average speed of the ball or player, as measured during the tennis match (or during previously played tennis matches), or as input by a user or administrator, as described in further detail hereinabove.

Thus, in one example, with a different size or average speed of the object of interest, a different one or two of the above made example's three background templates may be calculated.

Optionally, the computer executable instructions further include a step of automatically selecting the rule used for deriving 72 the background templates, among the two or more predefined rules, according to a characteristic which pertains to the background, say the background's being more static (say a fence or gate) as apposed to the background's being less static (say an audience of sport fans).

Optionally, the computer executable instructions further include determining that the background is more static or less static based on data input by a user, based on processing of audio input originating from the audience areas, etc., as described in further detail hereinabove.

Thus, in one example, with a different size or average speed of the object of interest, a different one or two of the above made example's three background templates may be derived 72.

It is expected that during the life of this patent many relevant devices and systems will be developed and the scope of the terms herein, particularly of the terms "Computer", "Camera", "Video", "Image", "CD-ROM", a "USB-Memory", a "Hard Disk Drive (HDD)", and "Solid State Drive (SSD)", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A computer implemented method of object extraction from video images, the method comprising steps a computer is programmed to perform, the steps comprising:
receiving a plurality of video images;
deriving a plurality of background templates from at least one of the received video images;
calculating a plurality of differences from an individual one of the received video images, each one of the differences being calculated between the individual video image and a respective and different one of the background templates; and
extracting an object of interest from the individual video image, using a rule applied on the calculated differences.

2. The method of claim 1, further comprising selecting the applied rule among a plurality of predefined rules.

3. The method of claim 1, further comprising allowing a user to select the applied rule.

4. The method of claim 1, further comprising selecting the applied rule, according to circumstances of capturing of the received video images.

5. The method of claim 1, further comprising selecting the applied rule, according to a characteristic pertaining to the object of interest.

6. The method of claim 1, further comprising selecting the applied rule, according to a characteristic pertaining to a background of the received video images.

7. The method of claim 1, wherein said deriving of the background templates is based on a rule selected among a plurality of predefined rules.

8. The method of claim 1, further comprising allowing a user to select a rule for said deriving of the background templates, wherein said deriving is based on the rule selected by the user.

9. The method of claim 1, wherein said deriving of the background templates is based on a rule selected according to circumstances of capturing of the received video images.

10. The method of claim 1, wherein said deriving of the background templates is based on a rule selected according to a characteristic pertaining to the object of interest.

11. The method of claim 1, wherein said deriving of the background templates is based on a rule selected according to a characteristic pertaining to a background of the received video images.

12. The method of claim 1, further comprising deriving each one of at least two of the background templates, using a respective and different one of a plurality of background calculation methods.

13. The method of claim 1, further comprising deriving each one of at least two of the background templates, using a respective and at least partially different subset of the received video images.

14. The method of claim 1, further comprising deriving each one of at least two of the background templates, using a respective and at least partially less recent subset of the received video images.

15. The method of claim 1, further comprising deriving each one of at least two of the background templates, using a respective and different frequency of sampling of the received video images.

16. The method of claim 1, further comprising deriving each one of at least two of the background templates, using a respective and different in size subset of the received video images.

17. The method of claim 1, further comprising updating each one of at least two of the background templates, with a respective and different update rate.

18. Apparatus for object extraction from video images, the apparatus comprising:
a computer;
a video image receiver, implemented on the computer, configured to receive a plurality of video images;
a background template deriver, in communication with said video image receiver, configured to derive a plurality of background templates from at least one of the received video images;
a difference calculator, in communication with said background template deriver, configured to calculate a plurality of differences from an individual one of the received video images, each one of the differences being calculated between the individual video image and a respective and different one of the background templates; and an object extractor, in communication with said difference calculator, configured to extract an object of interest from the individual video image, using a rule applied on the calculated differences.

19. A non-transitory computer readable medium storing computer executable instructions for performing steps of object extraction from video images, the steps comprising:

receiving a plurality of video image;

deriving a plurality of background templates from at least one of the received video images;

calculating a plurality of differences from an individual one of the received video images, each one of the differences being calculated between the individual video image and a respective and different one of the background templates; and extracting an object of interest from the individual video image, using a rule applied on the calculated differences.

* * * * *